United States Patent [19]

de Jager et al.

[11] 4,229,821

[45] Oct. 21, 1980

[54] SYSTEM FOR DATA TRANSMISSION BY MEANS OF AN ANGLE-MODULATED CARRIER OF CONSTANT AMPLITUDE

[75] Inventors: Frank de Jager; Cornelis B. Dekker, both of Eindhoven; Dirk Muilwijk, Hilversum, all of Netherlands

[73] Assignee: U.S. Philips Corporation, New York, N.Y.

[21] Appl. No.: 936,035

[22] Filed: Aug. 23, 1978

[30] Foreign Application Priority Data

Sep. 9, 1977 [NL] Netherlands .................. 7709917

[51] Int. Cl.² .................................. H04L 27/18
[52] U.S. Cl. .................................. 375/53; 375/86
[58] Field of Search ............... 325/30, 321, 163, 320; 178/66 R, 67, 88; 329/104, 110, 112

[56] References Cited

U.S. PATENT DOCUMENTS

| | | | |
|---|---|---|---|
| 3,818,378 | 6/1974 | Phillips | 325/30 |
| 3,916,313 | 10/1975 | Lowry | 178/67 |
| 3,993,868 | 11/1976 | Balcewicz | 325/30 |
| 4,109,101 | 8/1978 | Mitani | 325/30 |

*Primary Examiner*—Robert L. Griffin
*Assistant Examiner*—Michael A. Masinick

*Attorney, Agent, or Firm*—Thomas A. Briody; William J. Streeter; Edward W. Goodman

[57] ABSTRACT

A system having a transmitter and a receiver for transmitting binary data signals of a given symbol rate, an angle-modulated carrier signal of a substantially constant amplitude and a continuous phase being generated in the modulation stage of the transmitter, and the transmitted modulated signal being orthogonally, coherently demodulated in the receiver. The modulation stage of the transmitter is arranged so that the phase of the modulated signal changes in each symbol interval by an amount from the sequence $-\pi/2$, $-\pi/4$, 0, $\pi/4$, $\pi/2$ (rad.), which amount is determined for the relevant symbol interval by at least two successive data symbols, and the value of the phase within the relevant symbol interval is determined by a filtered version of at least these two successive data symbols. These measures result in a system which, without sacrificing the remaining desired communication properties of FFSK-systems, utilizes the available frequency spectrum in a more efficient manner than FFSK-systems, because the modulated signal has both a narrower spectral main lobe and, for frequencies outside this spectral main lobe, considerably less power than the FFSK-signal. Consequently this system is very well suited for efficient data transmission over radio links.

9 Claims, 19 Drawing Figures

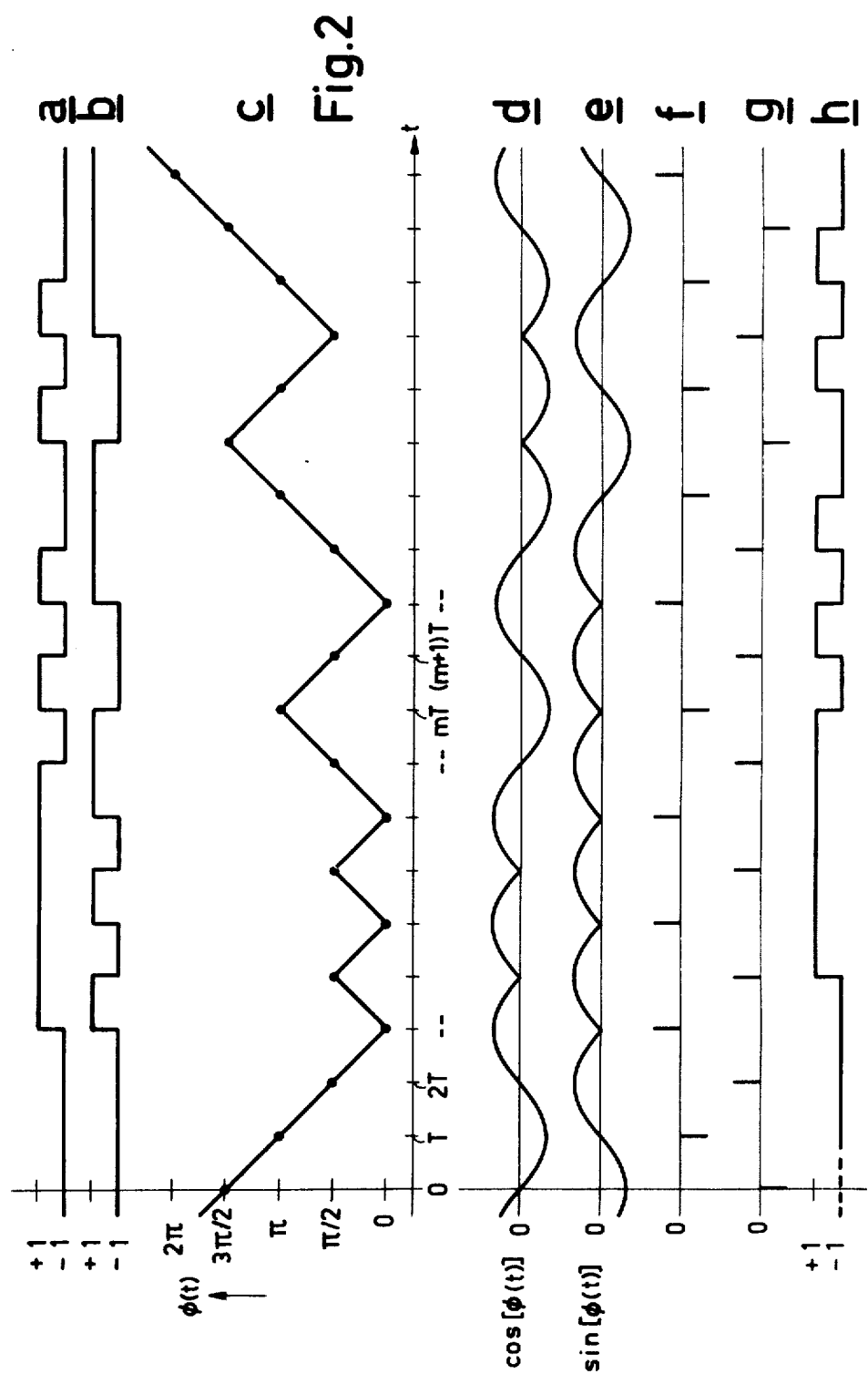

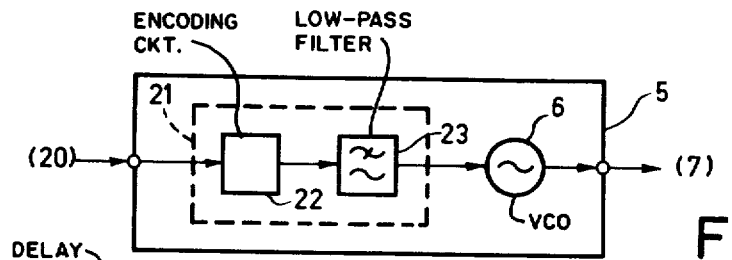
Fig. 4
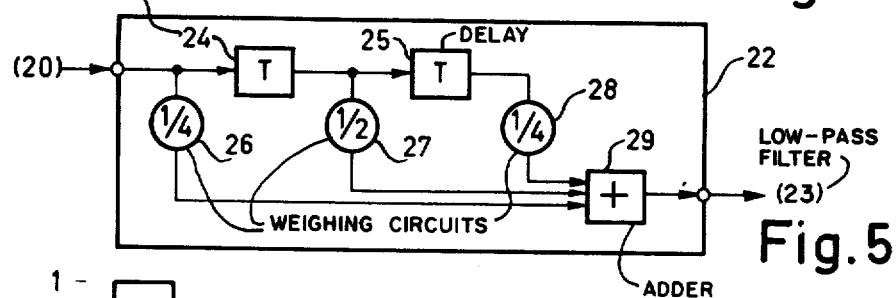
Fig. 5
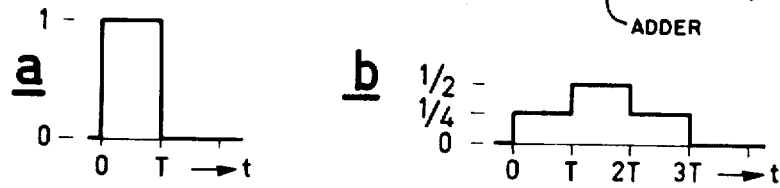
Fig. 6
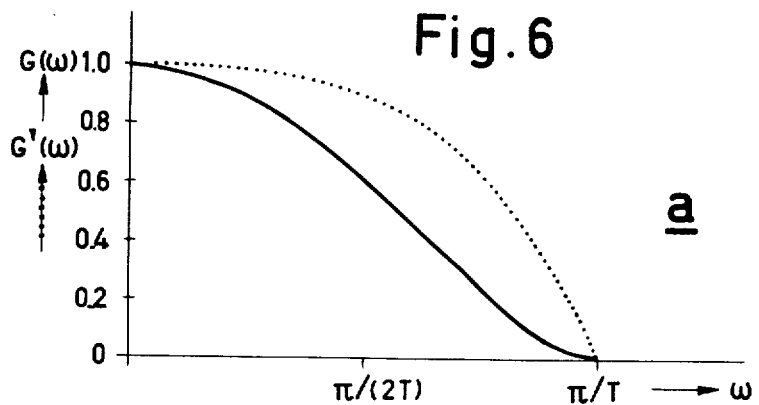
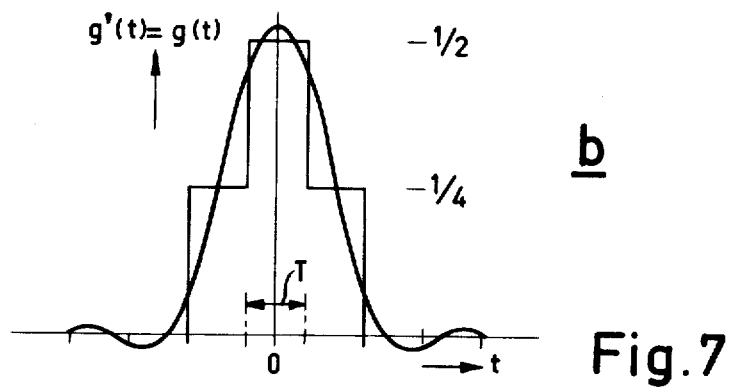
Fig. 7

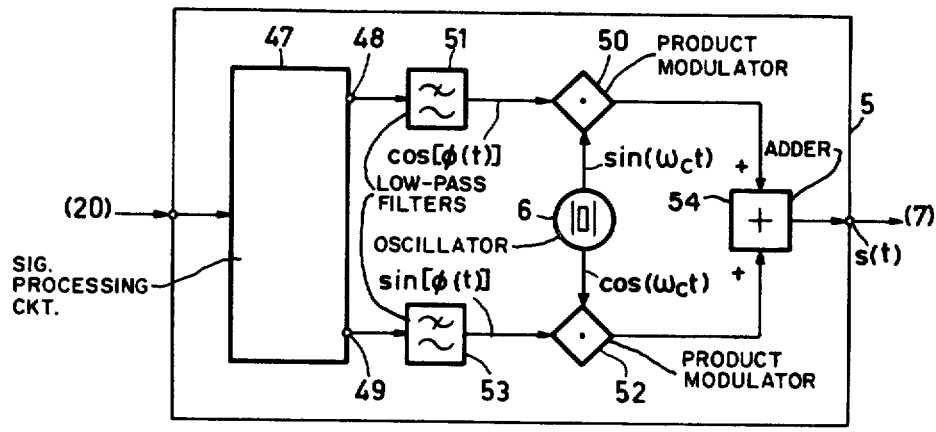
Fig.16
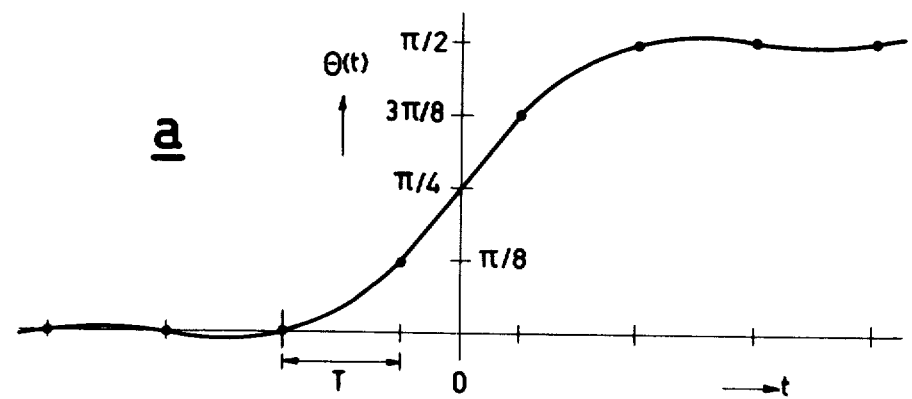
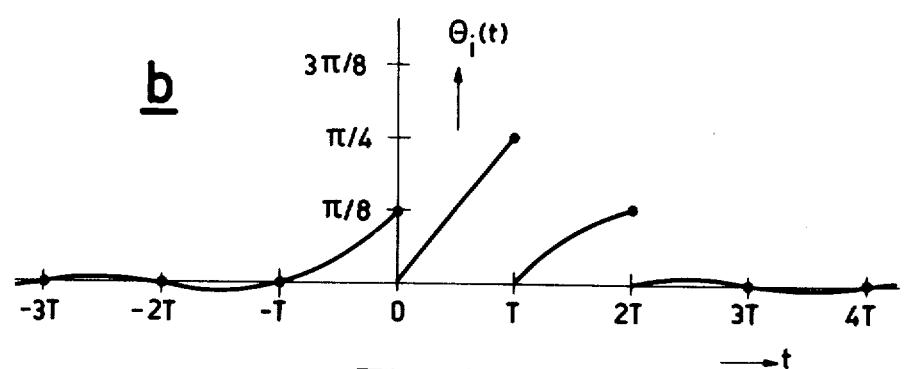
Fig.17

SYSTEM FOR DATA TRANSMISSION BY MEANS OF AN ANGLE-MODULATED CARRIER OF CONSTANT AMPLITUDE

BACKGROUND OF THE INVENTION

(1) Field of the Invention

The invention relates to a system for transmitting binary data signals with a given symbol rate 1/T from a transmitter to a receiver via a transmission channel of limited bandwidth, this transmitter comprising a data signal source, a clock signal source for synchronizing the data signal source, a modulation stage comprising a carrier oscillator connected to the data signal source for generating an angle-modulated carrier signal of a substantially constant amplitude and a continuous phase, and an output circuit for supplying the angle-modulated carrier signal to the transmission channel, the receiver comprising an input circuit for deriving the transmitted angle-modulated carrier signal from the transmission channel, a circuit coupled to the input circuit for recovering two reference carriers with a phase difference of $\pi/2$ rad., a demodulation circuit connected to the reference carrier circuit for coherently demodulating the transmitted angle-modulated carrier signal by these reference carriers for generating first and second demodulated signals, a circuit coupled to the input circuit for recovering two reference clock signals of half the symbol rate 1/(2T) with a phase difference of $\pi$ rad., and a regeneration circuit comprising two sampling circuits connected to the reference clock signal circuit for sampling the first and second demodulated signals with these reference clock signals and further comprising a logic combination circuit for obtaining regenerated binary data signals from the sampled first and second demodulated signals.

Several modulation methods for efficient data transmission over telephone lines have been developed and introduced these last fifteen years. In almost all cases these modulation methods result in a modulated carrier signal showing amplitude variations, and they utilize linear modulators and amplifiers.

However, these modulation methods are not so suitable for data transmission over radio links because in radio communication systems a high power efficiency requires the use of components having a non-linear amplitude transfer function and the spectrum at the output of such a component, for example a class-C amplifier, will be broader than that at the input if the signal shows amplitude variations. Radio communication systems must therefore utilize modulation methods resulting in a modulated carrier signal of a substantially constant amplitude, which implies the use of angle modulation (frequency or phase modulation).

The increasing need for systems for data transmission over radio links also imposes the requirement on the modulation methods to be utilized there of an efficient use of the bandwidth of the available transmission channel. Even if, to this end, a modulation method is used resulting in an angle-modulated carrier signal having a constant phase, the spectrum of this carrier signal will almost always be broader than that of the equivalent base-band signal. Limiting this spectrum by means of a channel filter is an unattractive technique for radio communication systems, as the practical implementation of such a filter with accurately prescribed amplitude and phase characteristics and, frequently, a very narrow relative bandwidth in the radio frequency range is particularly difficult and because many systems are, in addition, of the multi-channel type in which the carrier frequency to be transmitted must be able to assume a large number of different values. Consequently, in radio communication systems, a possible limitation of the spectrum of the angle-modulated carrier signal must be effected by means of premodulation techniques.

A further requirement of the modulation methods to be used in radio communication systems is that the corresponding detection methods result in an error probability as a function of the signal-to-noise ratio which degrades as little as possible relative to the error probabilty for optimum base-band transmission of the data signals. In addition, the receiver must also be able to detect the data signals reliably if unknown frequency shifts occur between transmitter and receiver. These requirements imply that coherent demodulation must be used in the receiver and that—in view of the required efficient use of power and bandwidth—it must be possible to recover the carrier and clock signal references required in the receiver from the transmitted modulated carrier signal itself.

(2) Description of the Prior Art

A system of the type mentioned in the preamble for transmission of binary data signals over radio links is known from reference D(1) In this system a modulation method is used which is a special case of phase coherent FSK (Frequency-Shift Keying) having a modulation index equal to 0.5 and which is known as FFSK (Fast Frequency-Shift Keying) or as MSK (Minimum-Shift Keying). The FFSK-method results in an angle-modulated carrier signal of a constant amplitude and a continuous phase which linearly increases or decreases during a symbol period T by an amount of $\pi/2$ rad., depending on the binary value of the relevant data symbol; the binary data signals can be detected optimally by means of orthogonal coherent demodulation and the carrier and block signal references required therefor can be recovered from the transmitted FFSK-signal itself.

Consequently, the FFSK-method has many properties which are desirable for efficient data transmission over radio links. Particularly, the power density spectrum of the FFSK-signal shows lower sidelobes than that of comparable signals obtained by means of conventional modulation methods such as 4-PSK (4 Phase-Shift Keying). However, these spectral sidelobes still cause interference in adjacent transmission channels, which interference has a level that is unacceptable for many practical applications.

As stated above, limiting the FFSK-spectrum by means of a channel filter is an unattractive technique for radio communication systems. In view of the many desired properties of the FFSK-method, much attention has therefore been paid in the past few years to premodulation techniques for further reducing the spectral sidelobes without sacrificing these desirable properties. Reference D(2) discloses a generalization of the FFSK (MSK)-method for reducing the spectral sidelobes by means of suitably chosen pulse shapes for the data symbols. This modulation method is known as SFSK (Sinusoidal Frequency-Shift Keying) and results in an angle-modulated carrier signal of a constant amplitude and a continuous phase, which decreases or increases sinusoidually during a symbol period T with an amount of $\pi/2$ rad. However, only for frequencies spaced more than twice the symbol frequency 1/T from the carrier frequency, the power density spectrum of this SFSK-signal falls considerably below that of the FFSK-signal, so that the SFSK-method furnishes no improvement as regards the reduction of the most annoying spectral sidelobes.

SUMMARY OF THE INVENTION

It is an object of the invention to provide a system of the type mentioned in the preamble for transmitting binary data signals which—without sacrificing the remaining desirable communication properties of FFSK-systems—utilizes the available frequency spectrum more efficiently than FFSK-systems by the use a modulation method resulting in a transmitted modulated signal having both a narrower spectral main lobe and, for frequencies outside this spectral main lobe, considerably less power than the FFSK-signal, which system is well suited for efficient data transmission over radio links.

The system according to the invention is characterized in that the modulation stage in the transmitter is arranged for generating an angle-modulated carrier signal of substantially constant amplitude, whose continuous phase $\phi(t)$ in each symbol interval of length T changes by an amount expressed in rad. from the series $-\pi/2$, $-\pi/4$, 0, $\pi/4$, $\pi/2$, this amount being determined for the relevant symbol interval by at least two successive data symbols, the value of the phase $\phi(t)$ for instants t within the relevant symbol interval being determined by a filtered version of at least these two successive data symbols.

SHORT DESCRIPTION OF THE DRAWINGS

Some embodiments of the invention and their advantages will now be further explained with reference to the drawings in which:

FIG. 2 shows some time diagrams for explaining the operation of the data transmission system in FIG. 1 if this system is arranged as a known FFSK-system as discussed in reference D(1);

FIG. 4 is a functional block diagram of a frequency modulation stage for the data transmission system in FIG. 1 if this system is arranged in accordance with the invention;

FIG. 5 is an example of a partial response encoding circuit which can be used in the frequency modulation stage of FIG. 4;

FIG. 6 shows examples of signal shapes at the input and output of the coding circuit in FIG. 5;

FIG. 7 shows a frequency diagram and a time diagram for explaining the operation of the frequency modulation stage in FIG. 4;

FIG. 16 is a general block diagram of a practical embodiment of an orthogonal modulation stage for a data transmission system in accordance with the invention;

FIG. 17 shows some time diagrams for explaining the operation of the signal processing circuit used in FIG. 16;

REFERENCES (1) R. de Buda "Coherent Demodulation of Frequency-Shift Keying with Low Deviation Ratio", IEEE Trans. Commun., vol. COM-20, No. 3, pp. 429-435, June 1972.

(2) F. Amoroso, "Pulse and Spectrum Modulation in the Minimum (Frequency) Shift Keying (MSK) Format", IEEE Trans. Commun., vol. COM-24, No. 3, pp. 381-384, March 1976.

(3) R. W. Lucky, J. Saltz, E. J. Weldon Jr., "Principles of Data Communication", New York: Mc.Graw-Hill, 1968.

(4) E. R. Kretzmer, "Generalization of a Technique for Binary Data Communication", IEEE Trans. Commun. Technol. vol. COM-14, No. 1, pp. 67-68, February 1966.

(5) W. R. Bennett, J. R. Davey, "Data Transmission". New York: Mc.Graw-Hill, 1976.

(6) S. Pasupathy, "Nyquist's Third Criterion", Proc. IEEE. vol. 62, No. 6, pp. 860-861, June 1974.

(7) P. Kabal, S. Pasupathy, "Partial-Response Signalling", IEEE Trans. Commun., vol. COM-23, No. 9, pp. 921-934, September 1975.

(8) A. D. Sypherd, "Design of Digital Filters using Read-Only Memories", Proc. NEC, Chigaco, vol. 25, pp. 691-693, 8-10 December 1969.

(9) R. W. Schafer, L. R. Rabiner, "A Digital Signal Processing Approach to Interpolation", Proc. IEEE, vol. 61. No. 6, pp. 692-702, June 1973.

(10) F. A. M. Snijders, N. A. M. Verhoeckx, H. A. van Essen, P. J. van Gerwen, "Digital Generation of Linearly Modulated Data Waveforms", IEEE Trans. Commun., vol. COM-23, No. 11, pp. 1259-1270, November 1975.

DESCRIPTION OF THE EMBODIMENTS (1) General Description

Figure 1:
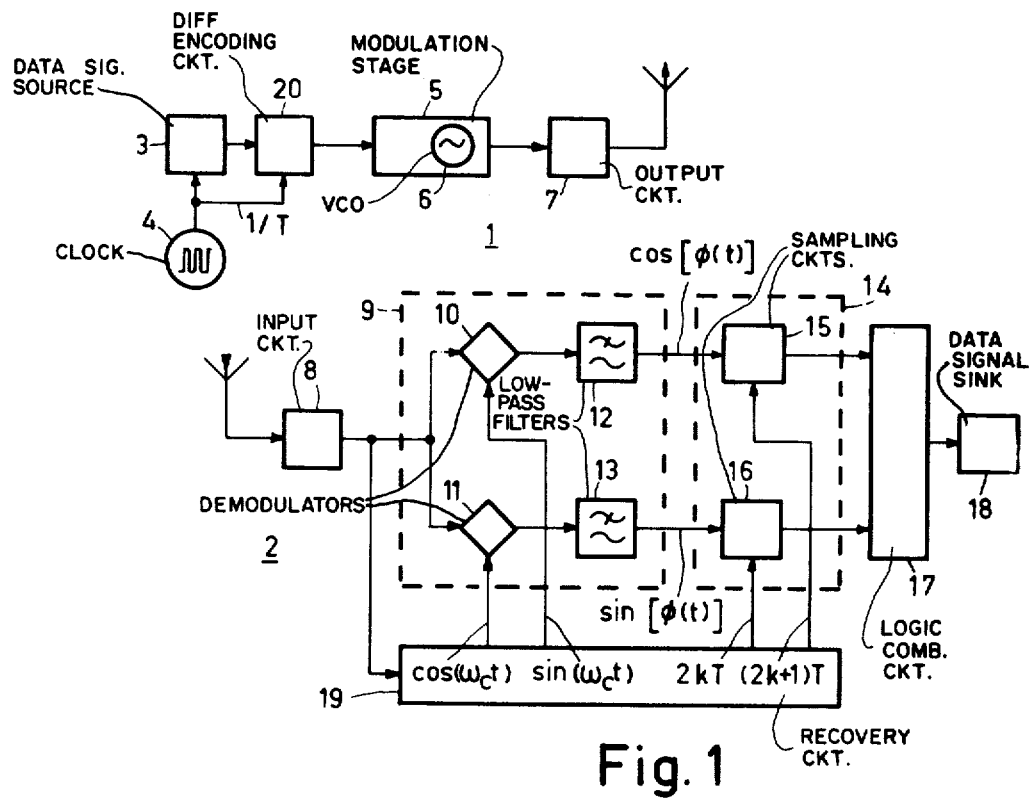
FIG. 1 shows a general block diagram of a system for binary data transmission by means of an angle-modulated carrier of constant amplitude.

FIG. 1 shows a general block diagram of a system for transmitting binary data signals from a transmitter 1 to a receiver 2 over a radio transmission channel, which diagram is applicable to both the FFSK-system known from reference D(1) and to the system according to the present invention.

Transmitter 1 comprises a data signal source 3 which is synchronized by a clock signal source 4. The binary data signals derived from source 3 at a symbol rate 1/T are applied to a modulation stage 5 comprising a carrier oscillator 6 for generating an angle-modulated carrier signal having a substantially constant amplitude and a continuous phase. This modulated signal is applied to the transmission channel through an output circuit 7, for example, an amplifier.

In receiver 2 this modulated signal is derived from the transmission channel through an input circuit 8, for example, an amplifier. The transmitted modulated signal is applied to an orthogonal coherent demodulation circuit 9 which comprises two synchronous demodulators 10, 11 to which lowpass filters 12, 13 are connected; these demodulators 10, 11 are supplied by two reference carriers having a phase difference of $\pi/2$ rad.. Two demodulated signals, which are applied to a regeneration circuit 14 comprising two sampling circuits 15, 16, appear then at the output of lowpass filters 12, 13. These sampling circuits 15, 16 are controlled by two reference clock signals of half the symbol rate 1/(2T) with a phase difference of $\pi/$rad.. The samples of these two demodulated signals thus obtained are applied to a logic combination circuit 17 for obtaining the original binary data signals which are passed on to a data signal sink 18 for further processing. In addition, receiver 2 comprises a circuit 19 coupled to input circuit 8 for a combined recovery of the required carrier and clock signal references from the transmitted modulated signal itself.

If the system shown in FIG. 1 is arranged as FFSK-system, modulation stage 5 can be implemented in several manners, as also stated in reference D(1). It is assumed here that modulation stage 5 is implemented as a frequency modulator having an ideal voltage controlled oscillator 6, whose rest frequency $f_o$ is always equal to the desired carrier frequency $f_c$ and whose gain constant $K_o$ is always equal to $\pi/(2T)$ rad. per volt per sec., to which oscillator 6 the binary data signals are applied in antipodal form as rectangular voltage pulses having a pulse width T and a pulse height 1. The desired FFSK-signal then appears with a constant amplitude at the output of oscillator 6.

To simplify the recovery of the reference carriers in the receiver, it is further assumed that the binary data signals in transmitter 1 are differentially encoded by means of a differential encoding circuit 20 controlled by clock signal source 4. Combined recovery circuit 19 can be implemented in several manners but for simplicity it is assumed here that this recovery circuit 19 comprises a frequency doubler which feeds two phase-locked loops the outputs of which are connected to the inputs of a balanced modulator. The low frequency output of the modulator is divided by two to generate two phase-shifted reference clock signals of half the symbol rate, the high frequency output is divided by four to generate the two phase-shifted reference carriers. The logic combination circuit 17 comprises two parallel channels, each of the channels having an exclusive OR-gate to which samples of the demodulated signals are applied directly and via a delay device. The outputs of the exclusive OR-gates are combined to the original binary data signals by means of inter-leaving gates.

The sole difference between receiver 2 in FIG. 1 and the receiver in accordance with reference D(1) then is that, in FIG. 1, use is made of lowpass filters 12, 13 having a transfer function such that the error probability in the absence of intersymbol interference is minimized. Further particulars of this known optimizing technique can be found in reference D(3), pages 109-111.

The operation of the FFSK-system described will now be further explained with reference to the time diagrams of FIG. 2.

Time diagram a shows the binary data signal of source 3 to be transmitted and time diagram b shows the associated differentially encoded data signal at the output of encoding circuit 20. In these diagrams a and b the binary value "1" corresponds to a value $+1$ and the binary value "0" to a value $-1$. Supplying this data signal b to modulation stage 5 results in a FFSK-signal which can be expressed in the form $$\sin[\omega_c t + \phi(t)] \qquad (1)$$

where $\omega_c = 2\pi f_c$ and $f_c$ is the carrier frequency. Time diagram c shows the phase $\phi(t)$ of this FFSK-signal in response to data signal b for the case $\phi(o) = 3\pi/2$ rad.. From time diagram c it appears that the phase $\phi(t)$ increases or decreases during a symbol period T by an amount of $\pi/2$ rad., depending on the binary value of the relevant symbol in data signal b.

In demodulation circuit 9 this FFSK-signal is multiplied by the two reference carriers and that by $\sin(\omega_c t)$ in demodulator 10 and by $\cos(\omega_c t)$ in demodulator 11. The low frequency components $\cos[\phi(t)]$ and $\sin[\phi(t)]$ respectively, which are shown in time diagrams d and e, then occur at the output of these demodulators 10 and 11. In regeneration circuit 14 the filtered low frequency components $\cos[\phi(t)]$ and $\sin[\phi(t)]$ are sampled with the two reference clock signals, the sampling pulses for sampling circuit 15 occurring at instants $t = (2k+1)T$ and those for sampling circuit 16 at instants $t = 2kT$ and k being an integer. As lowpass filters 12 and 13 substantially produce no intersymbol interference, the respective series of signal samples shown in time diagrams f and g occur at the output of the sampling circuits 15 and 16. Supplying the two series f and g to logic combination circuit 17, which supplies a value $+1$ or $-1$ depending on whether the present signal sample and the previous signal sample in the relevant series have the same or the opposite polarity, results then in a regenerated binary data signal which is shown in the time diagram h and which—apart from a constant delay over a symbol period T—corresponds to the binary data signal to be transmitted in time diagram a.

Figure 3:
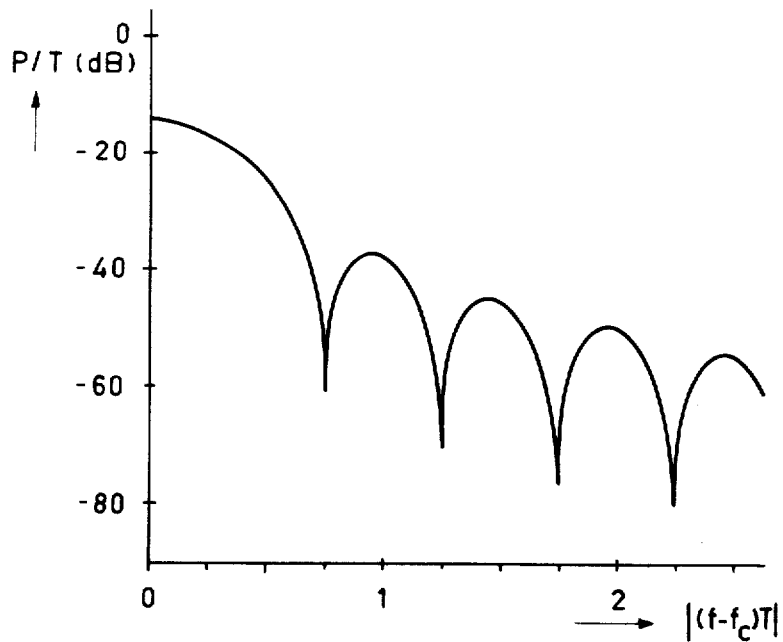
FIG. 3 shows the power density spectrum of the output signal of the modulation stage in the known FFSK-system.

Although the FFSK-system described has many properties which are desirable for satisfying the above-mentioned requirements for efficient data transmission over radio links, the spectrum of the FFSK-signal at the output of modulation stage 5 is still rather broad, as can also been seen from FIG. 3 in which the standardized spectral power density P/T as a function of the standardized frequency $|(f-f_c)T|$ is shown for this FFSK-signal in accordance with formula (1). FIG. 3 shows particularly that the level of the spectral power density for frequencies f, which are removed approximately 1.5 times the symbol rate 1/T from the carrier frequency $f_c$, is only about 30 dB lower than the level for the carrier frequency $f_c$ itself. For a channel spacing of 25 kHz, which is customary in radio communication systems, and data signals having a symbol rate of 16 kHz this implies that the FFSK-signal will cause interference of an impermissibly high level in the two adjacent transmission channels.

Without utilizing a post-modulation filter, which is unattractive for many radio communication systems, and without sacrificing the remaining desirable properties of the FFSK-system described, the spectral sidelobes of the modulated carrier signal can be considerably reduced if modulation stage 5 of the system shown in FIG. 1 is arranged in accordance with the invention for generating an angle-modulated carrier signal of substantially constant amplitude, whose continuous phase $\phi(t)$ in each symbol interval of length T changes by an amount, expressed in rad., from the series $-\pi/2$, $-\pi/4$. 0, $\pi/4$, $\pi/2$, which amount is determined for the relevant symbol interval by at least two successive data symbols, the value of the phase $\phi(t)$ for instants t within the relevant symbol interval being determined by a filtered version of at least these two successive data symbols.

For the time being it is now assumed that modulation stage 5 is also implemented as a frequency modulator having the same ideal voltage-controlled oscillator 6 as for the FFSK-system described. For this case FIG. 4 shows the functional block diagram of modulation stage 5. In this modulation stage 5 the differentially encoded data signals of encoding circuit 20 in FIG. 1 are applied in antipodal form to voltage-controlled oscillator 6 through a pre-modulation circuit 21, which comprises the cascade arrangement of a partial-response encoding circuit 22 and a lowpass filter 23 having a pulse response satisfying the third Nyquist-criterion.

The operation of modulation stage 5 as shown in FIG. 4 will now be explained for the case that encoding circuit 22—apart from a scale factor—gives a partial response of class 2 with 3 superpositions (see reference D(4)) and that lowpass filter 23 has the narrowest possible bandwidth (see reference D(5), page 65). In this case encoding circuit 22 can be implemented as shown in FIG. 5, in which the data signals from encoding circuit 20 in FIG. 1 are applied to the series arrangement of two delay elements 24, 25, each having a delay equal to the symbol period T, and the data signals at the ends of these delay elements 24, 25 are applied through weighting circuits 26, 27, 28 with weighting factors equal to ¼, ½, ¼, respectively, to an adder circuit 29. A single pulse, having a width T and a height 1, as shown at a in FIG. 6, at the input of encoding circuit 22 in FIG. 5 gives, at the output of adder circuit 29, a response of 3 successive pulses each having a width T and a height of ¼, ½, ¼, respectively, as shown in FIG. 6 at b. Apart from a constant delay of one symbol period T this coding circuit 22 has a transfer function $S(\omega)$ given by $$S(\omega) = \cos^2(\omega T/2) \tag{2}$$

In view of the pulse shape, chosen for the data symbols, filter 23 has a transfer function $H(\omega)$ given by $$H(\omega) = \begin{cases} \dfrac{(\omega T/2)^2}{\sin^2(\omega T/2)} & , \omega \leq \pi/T \\ 0 & , \omega > \pi/T \end{cases} \tag{3}$$

so that pre-modulation circuit 21 in FIG. 4 has a transfer function $G(\omega)$, for which it applies, on the basis of formulas (2) and (3) that $$G(\omega) = S(\omega) \cdot H(\omega) = \begin{cases} \dfrac{(\omega T/2)^2}{\tan^2(\omega T/2)} & , \omega \leq \pi/T \\ 0 & , \omega > \pi/T \end{cases} \tag{4}$$

FIG. 7 shows this transfer function $G(\omega)$ as well as the associated response g(t) on a single pulse having a width T and a height 1.

The operation of modulation stage 5 and of the system according to FIG. 1, comprising such a premodulation circuit 21, will now be further explained with reference to the time diagrams of FIG. 8.

Figure 8:
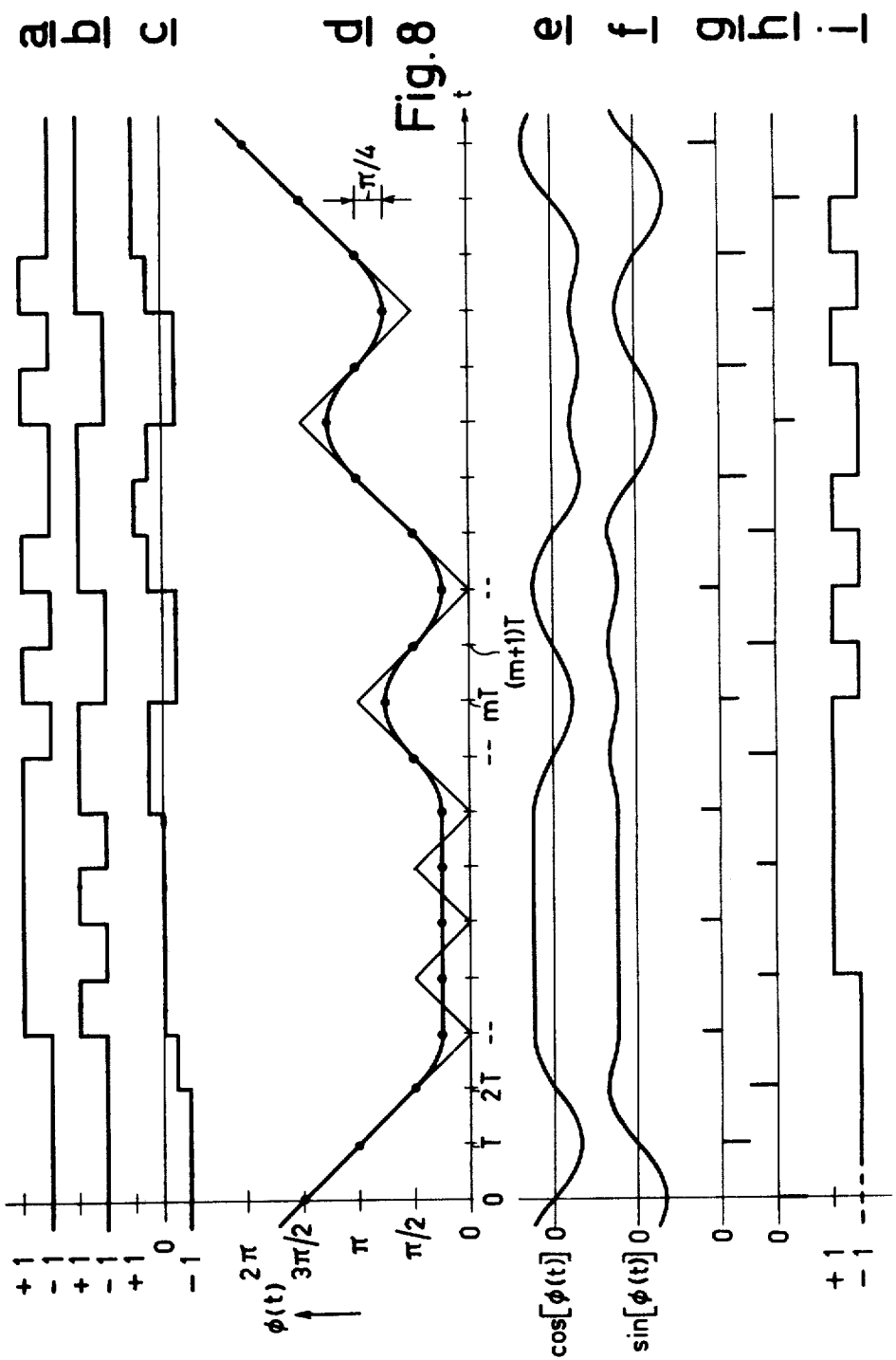
FIG. 8 shows some time diagrams for explaining the operation of the data transmission system in FIG. 1 if this system includes, in accordance with the invention, a frequency modulation stage as shown in FIG. 4.

Time diagrams a and b of FIG. 8 show the same data signals at the output of data signal source 3 and differential encoding circuit 20, respectively, of FIG. 1 as time diagrams a and b of FIG. 2. In response to data signal b, a signal occurs at the output of partial-response encoding circuit 22 in FIG. 4 (FIG. 5) which is shown in time diagram c of FIG. 8 with a constant advance of one symbol period T for simplifying a subsequent comparison with the FFSK-signal. Applying this partial-response signal c voltage-controlled oscillator 6 in FIG. 4 through filter 23 results in an angle-modulated carrier signal of constant amplitude, which can again be expressed in the form $$\sin[\omega_c t + \phi(t)] \tag{5}$$

Time diagram d of FIG. 8 shows the phase $\phi(t)$ of this signal due to partial-response signal c for the case $\phi(o) = 3\pi/2$ rad. (thick line) and likewise, for comparing purposes, the phase $\phi(t)$ which this signal would have at a direct supply of data signal b to voltage-controlled oscillator 6 (thin line), or, put differently, the phase $\phi(t)$ when using the FFSK-method already described (compare time diagram c of FIG. 2).

As is apparent from diagram d, the phase $\phi(t)$ changes between the instants $t = mT$ and $t = (m+1)T$, m being an integer, by an amount $\Delta\phi(m)$ equal to $\pm\pi/2$, $\pm\pi/4$ or 0 rad.. Since, the phase $\phi(t)$ at the output of voltage-controlled oscillator 6 is proportional to the integral of its output voltage u(t), it holds that $$\Delta\phi(m) = \phi((m+1)T) - \phi(mT) = K_0 \cdot \int_{mT}^{(m+1)T} u(t)dt \tag{6}$$

where, as mentioned above, $$K_0 = \pi/(2T) \tag{7}$$

Furthermore, filter 23 satisfies the third Nyquist criterion so that it applies that $$\Delta\phi(m) = K_0 \cdot \int_{mT}^{(m+1)T} u(t)dt = K_0 \cdot \int_{mT}^{(m+1)T} v(t)dt \tag{8}$$

where v(t) is the output voltage of partial-response encoding circuit 22. The relation between this voltage v(t) and data signal b at the output of encoding circuit 20 has already been described and it follows on the basis of this relation that $$\int_{mT}^{(m+1)T} v(t)dt = T[b(m)/4 + b(m-1)/2 + b(m-2)/4] \quad (9)$$

where b(m) represents a symbol of data signal b in time interval [mT,(m+1)T] with $b(m) = \pm 1$. On the basis of formulas (6)–(9), the relation $$\Delta\phi(m) = [b(m) + 2b(m-1) + b(m-2)]\pi/8 \quad (10)$$

applies for the phase change $\Delta\phi(m)$, so that this phase change $\Delta\phi(m)$ is determined by 3 successive data symbols b(m), b(m−1), b(m−2) as shown in the table below.

| b(m) | b(m − 1) | b(m − 2) | Δ φ(m) |
|---|---|---|---|
| +1 | +1 | +1 | +π/2 |
| +1 | +1 | −1 | +π/4 |
| +1 | −1 | +1 | 0 |
| +1 | −1 | −1 | −π/4 |
| −1 | +1 | +1 | +π/4 |
| −1 | +1 | −1 | 0 |
| −1 | −1 | +1 | −π/4 |
| −1 | −1 | −1 | −π/2 |

The shape of the phase $\phi(t)$ for instants t within the relevant time interval [mT,(m+1)T] depends on the specific choice of filter 23 satisfying the third Nyquist criterion. Even for the choice opted for here (filter 23 has the narrowest possible bandwidth), it follows from the shape of the pulse response g(t) of pre-modulation circuit 21 in FIG. 4, as shown in FIG. 7, that the value of the phase $\phi(t)$ within the relevant time interval is predominantly determined by the filtered version of said 3 successive data symbols b(m), b(m−1), b(m−2).

In the same way as in FIG. 2, the remaining time diagrams in FIG. 8 show the processing of the modulated carrier signal in accordance with formula (5) with a phase $\phi(t)$ in accordance with time diagram d of FIG. 8 in receiver 2 of FIG. 1. Time diagram e and f particularly show the low-frequency components cos $[\phi(t)]$ and sin $[\phi(t)]$ at the output of the respective demodulators 10 and 11, time diagrams g and h show the series of signal samples at the output of the respective sampling circuits 15 and 16, finally, time diagram i shows the regenerated data signal at the output of logic combination circuit 17, it being assumed that lowpass filters 12, 13 have again been optimized by means of the technology from reference D(3) mentioned above, in view of the altered circumstances.

From the time diagrams g and h of FIG. 8, it appears that if the phase $\phi(t)$, in accordance with time diagram d of FIG. 8, is equal to odd multiples of $\pm\pi/4$ rad., the signal samples have a value which is a fraction $1/\sqrt{2} \approx 0.7$ of the value for phases $\phi(t)$ equal to 0 rad., $\pm\pi/2$ rad. or multiples thereof, so that, at the relative instants, a deterioration in the signal-to-noise ratio is caused as compared to the prior art FFSK-system. Nevertheless, the error probability as a function of the signal-to−noise ratio shows in practice no corresponding deterioration. Since it appears from time diagram d of FIG. 8 that lowpass filters 12, 13 must also pass changes having a period of 2T in the case of FFSK-signals (thin line), in the present case (thick line), they must also pass changes having a period of only 4T. Compared to the prior art FFSK-system, the bandwidth of lowpass filters 12, 13 can be halved, in the present case, in a first approximation. If now these lowpass filters 12, 13 are optimized for both cases by means of the above-mentioned known techniques, then it appears that, in the present case, the deterioration in the error probability as a function of the signal-to-noise ratio, relative to that for the prior art FFSK-system, is less than 1 dB.

Figure 9:
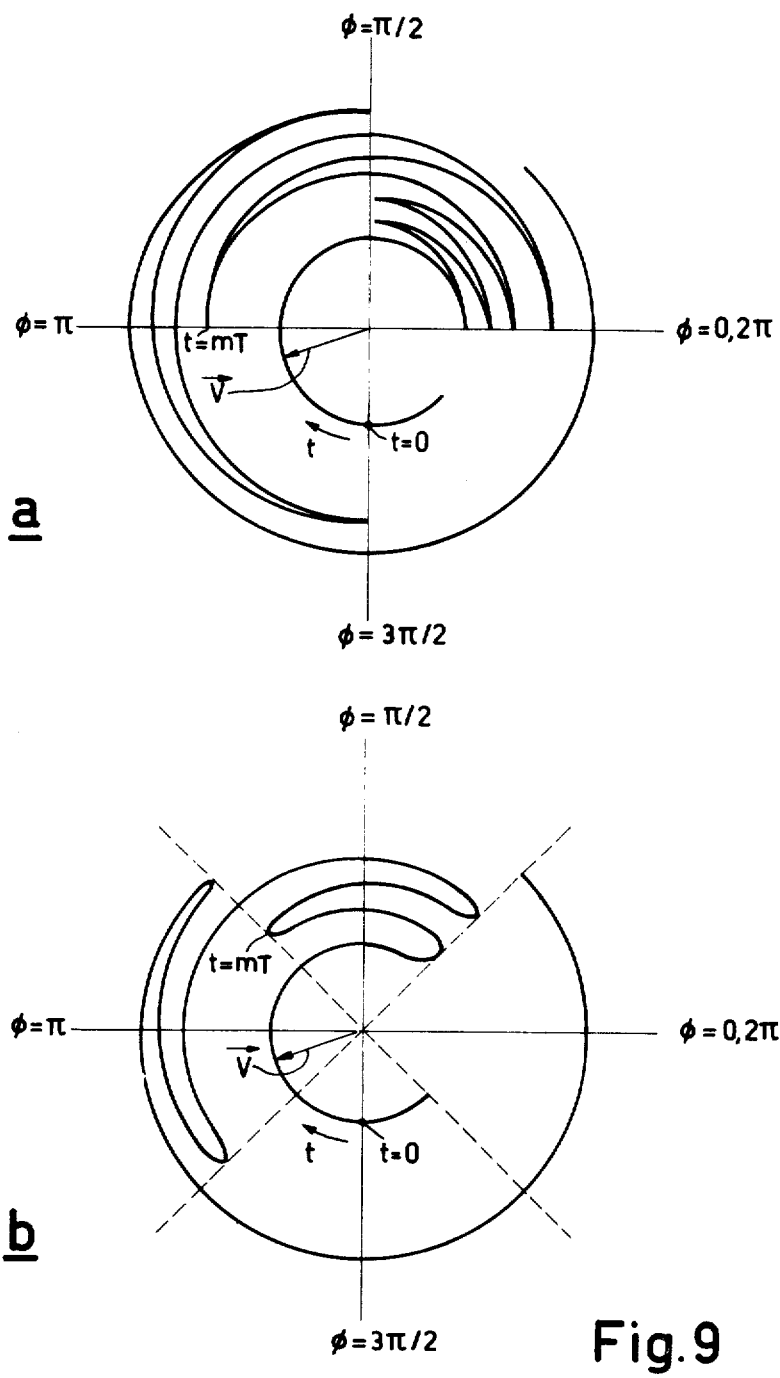
FIG. 9 shows two signal vector diagrams belonging to the time diagrams in FIG. 8.

The more gradual variation in phase $\phi(t)$ as a function of the time t in the present case is clearly shown by the diagrams of FIG. 9 in which a signal vector $$\vec{v} = A \exp[j\phi(t)] \quad (11)$$

is shown for both cases with a linearly increasing amplitude A (in actual practice this amplitude A is constant) and with a phase $\phi(t)$ in accordance with time diagram d of FIG. 8, diagram a showing this vector $\vec{v}$ for the FFSK-signal and diagram b likewise for the present modulated signal. A comparison of these vector diagrams a and b shows that a number of superfluous tumbles of signal vector $\vec{v}$ for the FFSK-signal can be prevented by applying the above-described measures in modulation stage 5.

Figure 10:
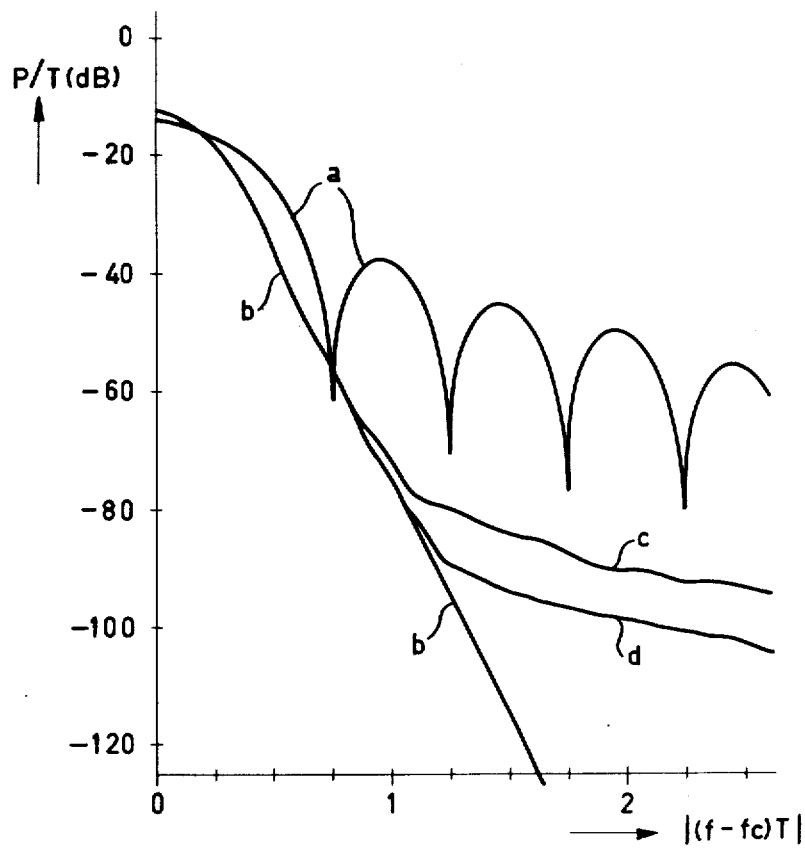
FIG. 10 shows some power density spectra of the output signal of the modulation stage in a data transmission system in accordance with the invention.

Due to this more gradual character of its phase variation, the present modulated signal has a frequency spectrum which has both a narrower main lobe and, especially for frequencies outside this main lobe, a considerably lower power than the FFSK-signal. This is also shown by FIG. 10, in which the standardized spectral power density P/T as a function of the standardized frequency $|(f-f_c)T|$ is shown for both cases, curve a applying for the FFSK-signal (cf. FIG. 3) and curve b for the modulated signal at the output of modulation stage 5 in FIG. 4. FIG. 10 shows in particular that for frequencies f, which are removed approximately 1.5 times the symbol rate 1/T from the carrier frequency $f_c$, the level of the spectral power density relative to that for the carries frequency $f_c$ itself is only about 30 dB lower for a FFSK-modulation stage 5 (curve a), whereas, on the contrary, it is more than 100 dB lower for a modulation stage 5 in accordance with FIG. 4 in which the above-described measures are used (curve b). For radio communication systems having the above-mentioned channel spacing of 25 kHz and data signals having the above-mentioned symbol rate of 16 kHz, the use of these measures implies that interference in the two adjacent radio transmission channels remains amply below the practically acceptable levels.

In this manner a data transmission system has been obtained which has the same desirable communication properties as the prior art FFSK-system (the very slight deterioration in the error probability as a function of the signal-to-noise ratio—less than 1 dB—is hardly of any significance in practice), but which can utilize the available frequency spectrum more efficiently than this prior art FFSK-system due to the remarkable reduction in the power outside the frequency band of the spectral main lobe, which itself is, in addition, narrower. As will be explained hereinafter, also the practical implementation of this data transmission system is particularly simple so that this system is eminently suitable in all respect for an efficient data transmission over radio links.

As explained above, the remarkable reduction in the power outside the actual frequency band of the spectral main lobe is obtained by means of a modulation stage 5 in accordance with FIG. 4 having a pre-modulation circuit 21 which may be considered as a filter having a transfer function G(ω) in accordance with formula (4). Although such a filter can be implemented in many different ways, a configuration as a digital transversal filter offers many practical advantages. The data signals are then applied to this digital transversal filter in the form of signal samples having the value +1 or −1, so that, in connection with the altered pulse shape of the data signals, the digital transversal filter should have a transfer function G'(ω) which is given by $$G'(\omega) = T \frac{\sin(\omega T/2)}{(\omega T/2)} \cdot G(\omega) \tag{12}$$

where G(ω) is the transfer function in accordance with formula (4). For comparison with G(ω) of formula (4), G'(ω) given by formula (12) in FIG. 7a is illustrated by means of a dotted line. The impulse response g'(t), which is associated with the transfer function G'(ω), is equal to the response g(t) which is associated with the transfer function G(ω), on a single pulse having width T and height 1, and is shown in FIG. 7b. In this case, however, a certain limitation of the duration of the impulse response must be accepted because a transversal filter has an impulse response of finite duration and the impulse response g'(t), associated with the transfer function G'(ω) in accordance with formula (12), is infinitely long. It appears, however, from FIG. 7 that this impulse response g'(t)=g(t) has its most significant values in a central interval of length 3T, and that its values outside a central interval of length 7T deviate only very little from the value zero. If now the duration of the impulse response of the digital transversal filter is limited to central intervals of impulse response g'(t)=g(t) having a length of 5T and 7T, respectively, then the transfer function of this transversal filter forms a good, or very good, approximation respectively of the desired transfer function G(ω) in accordance with formula (12). A simple lowpass filter is connected to the output of the digital transversal filter for suppressing undesired signals at the output sampling rate or multiples thereof. The influence of these limitations in the duration of the impulse response on the spectrum at the output of modulation stage 5 in FIG. 4 is shown in FIG. 10 by curve c for a limitation to 5T and by curve d for a limitation to 7T. The deviations of these curves c and d relative to curve a for an impulse response g'(t)=g(t) of infinite duration do not get any real significance until frequencies f for which |(f−f_c)T| exceeds 1, but also for frequencies f for which |(f−f_c)T| has approximately the value 1.5, the level of the spectral power density for these curves c and d is yet approximately 70 dB or 80 dB, respectively, lower than that for the carrier frequency f_c. The interference which the remaining power outside the frequency band of the spectral main lobe causes in the two adjacent transmission channels has also, in these two cases, a level which is sufficiently low for the majority of practical applications in the radio frequency field.

In the preceding it was assumed that the transfer function H(ω) of lowpass filter 23 in pre-modulation circuit 21 of FIG. 4 has the narrowest possible bandwidth. However, this filter 23 can also have a transfer function of a large bandwidth. From reference D(6) it is known that a transfer function H'(ω) with an impulse response satisfying the third Nyquist criterion can be converted into a transfer function N'(ω) having an impulse response satisfying the first Nyquist criterion. On the basis of this known result and the pulse shape chosen here for the data signals, transfer function H(ω) of filter 23 can be written in a more general form as $$H(\omega) = \frac{(\omega T/2)^2}{\sin^2(\omega T/2)} \cdot N'(\omega) \tag{13}$$

Figure 11:
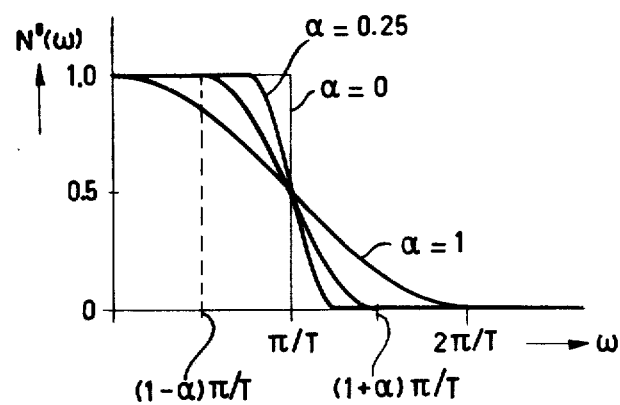
FIG. 11 shows some examples of Racos-characteristics for explaining a filter which can be used in the frequency modulation stage of FIG. 4.

An impression of the influence of the bandwidth can be obtained by chosing for N'(ω) a class of characteristics which is used on a large scale and which is known as Racoscharacteristic (Racos="Raised-cosine"), some of which are shown in FIG. 11 (cf. reference D(3), pages 50–51). A Racos-characteristic consists of a portion having a constant amplitude and a portion having a sinusoidially decreasing amplitude and can be specified by a parameter α, indicating how much the bandwidth exceeds the minimum Nyquist bandwidth of π/T. In the case α=0, H(ω) in accordance with formula (13) is equal to H(ω) in accordance with formula (3), and filter 23 has the narrowest possible bandwidth. From reference D(3), pages 50–51, it is known that N'(ω) for a Racos-characteristic can be written as $$N'(\omega) = \begin{cases} 1 & ,0 \leq \omega \leq (1-\alpha)\pi/T \\ 0,5[1-\sin((\omega T-\pi)/2\alpha)] \cdot (1-\alpha)\pi/T \leq \omega \leq (1+\alpha)\pi/T \\ 0 & ,\omega > (1+\alpha)\pi/T \end{cases} \tag{14}$$

Pre-modulation circuit 21 of FIG. 4 then has a transfer function G(ω)=S(ω).H(ω), which follows from formulas (2), (13) and (14). The influence of the bandwidth of H(ω), in accordance with formula (13), on the spectrum at the output of modulation stage 5 in FIG. 4, can then be checked by varying the parameter α of N'(ω) given by formula (14). In general it appears that lower values of bandwidth parameter α furnish a better reduction in the power outside the frequency band of the spectral main lobe than higher values. If, again, the duration of the pulse response of this pre-modulation circuit 21 is limited to a central interval having a length of 5T and if, furthermore, the bandwidth parameter α is varied, then it appears that the spectral power density does not deviate to any worthwhile extent from that for α=0, which is represented by curve c in FIG. 10, if α is smaller than 0.25. This mitigates the requirements to be made on transfer function G(ω) of pre-modulation circuit 21 of FIG. 4, and simplifies the practical implementation of this pre-modulation circuit as a digital transversal filter having a transfer function G'(ω) in accordance with formula (12).

The operation of modulation stage 5 shown in FIG. 4 is explained above with the assumption that encoding circuit 22—apart from a scale factor—gives a class 2 partial response with 3 superpositions. Such a response can be described simply as a polynomial by means of the (algabraic) delay operator D for a delay over one symbol period T, $D^k$ representing a delay over k symbol periods and $I=D^0$ an identity operator (cf. reference D(7)). In the case considered so far, coding circuit 22 can be characterized by a partial response polynomial F(D) satisfying the relation $$F(D) = I + 2D + D^2 \tag{15}$$

and by a scale factor 1/s, where s is the sum of the absolute values of the coefficients in the polynomial F(D), so that it here applies that: s=4.

However, other partial-response polynomials can also be used for encoding circuit 22 of FIG. 4. Two examples of these polynomials, often used in practice, will now be considered, it being assumed as it was above, that lowpass filter 23 has a transfer function $H(\omega)$ in accordance with formula (3) and, consequently, has the narrowest possible bandwidth. The first example is a partial response of class 1 with 2 superpositions, which gives the duobinary code and which is described by a polynomial F(D) satisfying the relation $$F(D) = 1 + D \tag{16}$$

with a scale factor $1/s = \frac{1}{2}$. The second example is a partial response of class 4 with a superposition which gives the modified duobinary code and is described by a polynomial F(D), satisfying the relation $$F(D) = 1 - D^2 \tag{17}$$

with a scale factor $1/s = \frac{1}{2}$. In both cases encoding circuit 22 can be implemented in a similar manner as in FIG. 5 by means of delay elements, weighting circuits and an adder circuit, the weighting factors following from the coefficients in polynomial F(D) given by formulas (16), (17) and the scale factors $1/s = \frac{1}{2}$. It will be explained, with reference to the time diagrams of FIG. 12, which consequences this other choice of partial-response polynomial F(D) has.

Figure 12:
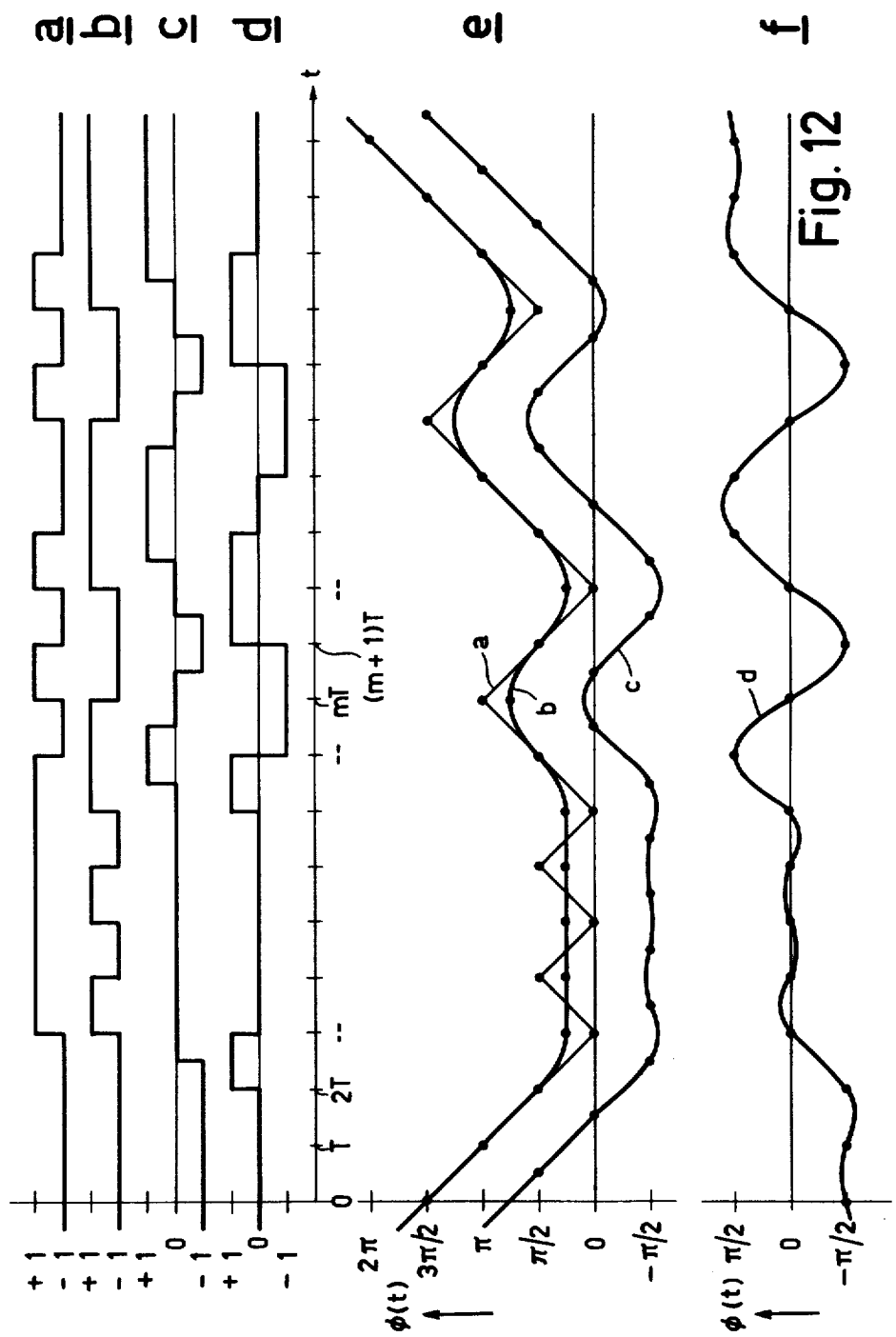
FIG. 12 shows some time diagrams for explaining the operation of the frequency modulation stage in FIG. 4, if partial responses of other classes than in the example of FIG. 5 are used therein.

Time diagrams a and b of FIG. 12 show the same data signals at the output of data source 3 and differential encoding circuit 20, respectively, in FIG. 1 as the time diagrams a and b of FIG. 2 and FIG. 8. In response to data signal b, a partial-response signal occurs at the output of encoding circuit 22 in FIG. 4, which signal is represented in time diagram c for the case of the duobinary code having a polyomial F(D) given by formula (16) and in time diagram d for the case of the modified duobinary code with a polynomial F(D) given by formula (17) with a constant advance of respectively T/2 and T. Applying these signals c and d to voltage-controlled oscillator 6 in FIG. 4 through filter 23 again results in a signal of the shape $$\sin [\omega_c t + \phi(t)] \tag{18}$$

whose phase $\phi(t)$ is shown in time diagram e by curve c for signal c and $\phi(o) = 3\pi/4$ and in time diagram f by curve d for signal d and $\phi(o) = -\pi/2$. For comparison, time diagram e also shows the phase $\phi(t)$ when using the prior art FFSK-method (curve a) and the phase $\phi(t)$ when using the encoding circuit 22 already extensively explained, with a polynomial F(D) given by formula (15) and a scale factor $1/s = \frac{1}{4}$ in modulation stage 5 of FIG. 4 (curve b), these curves a and b corresponding to the curves in time diagram d of FIG. 8.

In a similar manner as for polynomial F(D) given by formula (15), the phase variation $\Delta\phi(m)$ between the instants $t = mT$ and $t = (m+1)T$, where m is an integer, can be derived, resulting for polynomial F(D) given by formula (16) in $$\Delta\phi(m) = [b(m) + b(m-1)]\pi/4 \tag{19}$$

and for polyomial F(D) given by formula (17) in $$\Delta\phi(m) = [b(m) - b(m-2)]\pi/4 \tag{20}$$

b(m) again representing a symbol of data signal b in time interval $[mT, (m+1)T]$ with $b(m) = \pm 1$. As appears from these formulas (19) and (20) and from time diagram e and f of FIG. 12, the use of the duobinary code (curve c) and the modified duobinary code (curve d) results in that of the series of possible values $-\pi/2$, $-\pi/4$, 0, $\pi/4$, $\pi/2$ for the phase changes $\Delta\phi(m)$ only the values $-\pi/2$, 0, $\pi/2$ are used. A comparison of these curves c and d with curve a for the known FFSK-signal shows that also, when using the polyomials F(D) given by formulas (16) and (17), the phase $\phi(t)$ as a function of the time t has a more gradual character than the phase $\phi(t)$ of the FFSK-signal, so that also, in these two cases, the spectrum of the modulated signal at the output of modulation stage 5 in FIG. 4 has both a narrower main lobe and, especially for frequencies outside this main lobe, also considerably less power than the FFSK-signal. A further comparison of these curves c and d with curve b for the case extensively explained with reference to FIGS. 4–10, shows that the changes in the phase $\phi(t)$, to be passed by lowpass filters 12, 13 in receiver 2 of FIG. 1, have the curves b, c and d a period of 4T (for curve a this period is 2T) but have for both curve c and for curve d a larger "amplitude" than for curve b, the "amplitude" for curve d exceeding in its turn that for curve c. The spectrum of the modulated signal at the output of modulation stage 5 in FIG. 4 will consequently be somewhat broader when the duobinary code, with polynomial F(D) given by formula (16), is used than when using the duobinary code having a polynomial F(D) given by formula (15), and, when using the modified duobinary code with a polynomial F(D) given by formula (17), will be broader, in its turn, than when using the duobinary code with a polynomial F(D) given by formula (16).

As also appears from time diagram f of FIG. 12, the use of the modified duobinary code (curve d) results in that not only the phase change $\Delta\phi(m)$ but also the phase $\phi(t)$ itself can only assume the values $-\pi/2$, 0, $\pi/2$ at the instants $t = mT$ and can further remain at one and the same value for a long period of time. It appears that in this case the spectrum of the modulated signal at the output of modulation stage 5 in FIG. 4 has discrete components at the carrier frequency $f_c$ and at the frequencies $f = f_c + 1/T$, so that recovering the carrier and clock signal references in receiver 2 of FIG. 1 can be simpler in this case than in the two other cases considered above.

As regards the construction of receiver 2 in FIG. 1, it should be noted that the introduction of the premodulation circuit 21, with a given partial-response polynomial F(D) for encoding circuit 22 in accordance with FIG. 4, should generally be accompanied by a renewed optimization of lowpass filters 12, 13 and by a modification, adapted to the polynomial F(D), of logic combination circuit 17, although this last modification is not necessary in all cases. It has already previously been indicated that the same logic combination can be used for a polynomial F(D) given by formula (15) as in the prior art FFSK-system. It further appears that this last remark also applies for a polynomial F(D) given by formula (16), provided both demodulators 10, 11 are then fed by reference carrier waves which have been subjected to an additional phase shift of $\pi/4$ rad., more in particular demodulator 10 by a carrier $\sin(\omega_c t + \pi/4)$ and demodulator 11 by a carrier $\cos(\omega_c t + \pi/4)$. This has the advantage that in these cases the processing of the signal samples at the output of the two sampling circuits 15, 16 is exclusively based on the polarity of these signal samples and so, in principle, is independent from the level of the received modulated signal.

Figure 13:
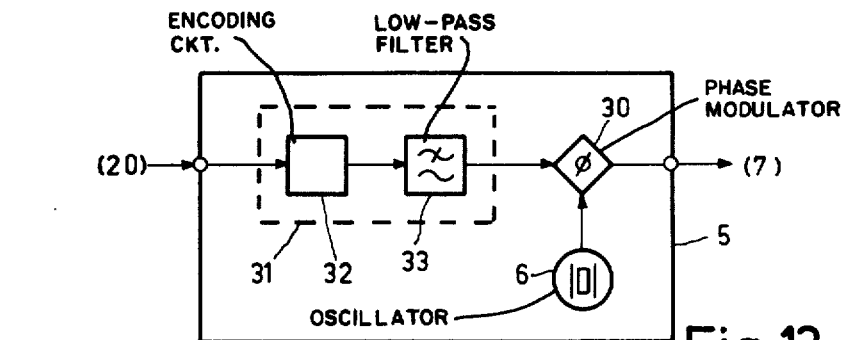
FIG. 13 is a functional block diagram of a phase modulation stage for the data transmission system in FIG. 1 when this system is arranged in accordance with the invention.

In all previous considerations it was always assumed that modulation stage 5 is implemented as a frequency modulator having an ideal voltage-controlled oscillator. However, modulation stage 5 can also be implemented as a phase modulation stage and the functional block diagram relating to that case is shown in FIG. 13. This modulation stage 5 comprises an ideal phase modulator 30 having a gain factor always equal to $\pi/2$ rad. per volt, which phase modulator 30 is fed by a carrier wave oscillator 6 of a constant frequency always equal to the desired carrier frequency $f_c$. In this modulation stage 5 the differentially encoded data signals of encoding circuit 20 in FIG. 1 are applied in antipodal form to phase modulator 30 through a pre-modulation circuit 31 which comprises the cascade arrangement of a partial-response encoding circuit 32 and a lowpass filter 33 having a pulse response satisfying the first Nyquist criterion.

To explain the operation of this modulation stage 5 shown in FIG. 13, all preceding considerations for modulation stage 5 shown in FIG. 4 need not be repeated. It can, namely, be proved that the phase $\phi(t)$ of the modulated signal at the output of modulation stage 5 in FIG. 4—except for a constant delay over a time T/2, half the symbol period—varies in the same manner as the phase $\phi(t)$ of the modulated signal at the output of modulation stage 5 in FIG. 13, if the partial-response polynomial F(D) of encoding circuit 22 in FIG. 4 and the partial-response polynomial P(D) of encoding circuit 32 in FIG. 13 satisfy the relation $$F(D) = (I-D)P(D) \tag{21}$$

and if the transfer function $H(\omega)$ of lowpass filter 23 in FIG. 4 and the transfer function $N_1(\omega)$ of lowpass filter 33 in FIG. 13 satisfy the relation (cf. reference D(6))

$$H(\omega) = \frac{(\omega T/2)}{\sin(\omega T/2)} \cdot N_1(\omega) \tag{22}$$

By means of these relations the properties of phase modulation stage 5 of FIG. 13 can always be converted into the properties of frequency modulation stage 5 of FIG. 4. This will be illustrated with reference to the time diagrams of FIG. 12 for the case phase modulation stage 5 of FIG. 13 utilizes a duobinary code with a polynomial P(D) which is given by (cf. formula (16))

$$P(D) = I + D \tag{23}$$

A data signal in accordance with time diagram b of FIG. 12 at the input of encoding circuit 32 in FIG. 13 then results in a partial-response signal according to time diagram c of FIG. 12 at the output. Supplying such a partial-response signal c to phase modulator 30 in FIG. 13 through lowpass filter 33 then results in a modulated signal whose phase $\phi(t)$—except for a constant shift over a time T/2—varies in the same manner as for curve d in time diagram f of FIG. 12, as can be easily checked. This curve d in time diagram f of FIG. 12 has, however, been obtained by applying a data signal in accordance with time diagram b to a frequency modulation stage 5, shown in FIG. 4, in which a modified duobinary code is used with a polyomial F(D) which is given in accordance with formula (17) by $$F(D) = I - D^2 \tag{24}$$

As this polynomial F(D) can be written as $$F(D) = I - D^2 = (I-D)(I+D) \tag{25}$$

it appears that, between the polynomials F(D) of formula (24) and P(D) of formula (23), the relation in accordance with formula (21) indeed exists, so that in this case phase modulation stage 5 of FIG. 13 and frequency modulation stage 5 of FIG. 4 have the same properties as regards the modulated signal at their output.

(2) Practical implementation of the modulation stage

It appears, from the considerations in the previous paragraph, section E(1), that from the point of view of efficient use of the available frequency spectrum, the arrangement of modulation stage 5 in transmitter 1 of FIG. 1 should be preferred which results in a modulated signal whose total phase change $\Delta\phi(m)$ between the instants $t=mT$ and $t=(m+1)T$ is determined by a partial response of class 2 with 3 superpositions (cf. formulas (10) and (15)) and whose shape of the phase $\phi(t)$ for instants t within the relevant time interval is determined by a filter response satisfying the third Nyquist criterion and having a spectral bandwidth of substantially the minimum Nyquist bandwidth (cf. filter response $g'(t) = g(t)$ in FIG. 7). Two different types of implementations of modulation stage 5 will now be considered, which can indeed be used more generally but whose particulars will always be given for the above-mentioned case.

Figure 14:
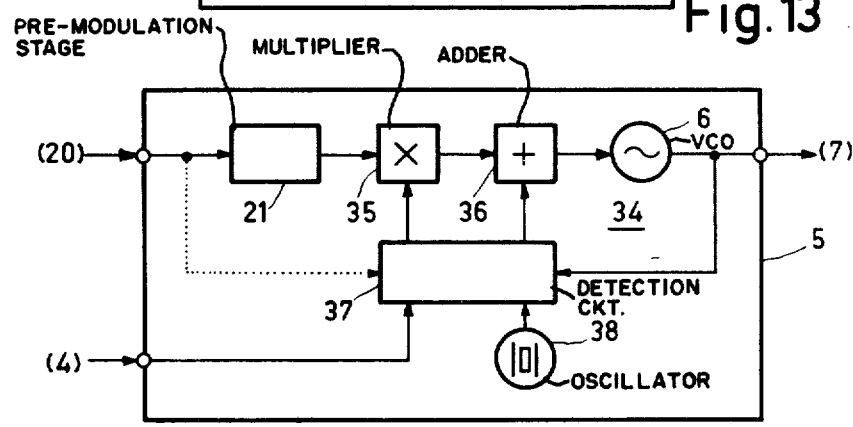
FIG. 14 is a general block diagram of a practical embodiment of a frequency modulation stage for a data transmission system in accordance with the invention.

The general block diagram of a first type of implementation of modulation stage 5 is shown in FIG. 14, which diagram is based on the functional block diagram of a frequency modulation stage 5 as illustrated in FIG. 4. Elements in FIG. 14 which correspond to elements in FIG. 4 have been given the same reference numerals in FIG. 14 as in FIG. 4. In FIG. 14 the differentially encoded data signals of encoding circuit 20 in FIG. 1 are applied to a pre-modulation circuit 21 which, as explained, can be realised in practice in a simple manner as a digital filter having a transfer function $G'(\omega)$ in accordance with formula (12) and an impulse response $g'(t)$ as illustrated in FIG. 7, but of a limited duration, a lowpass filter being connected to this digital filter for suppressing undesired signal components of the output sampling rate and multiples thereof. Further particulars about the practical realization of such a digital filter can, for example, be found in reference D(8).

So in FIG. 14 the output signal of premodulation circuit 21 is applied to a voltage-controlled oscillator 6, of which it was already assumed hereinbefore that its rest frequency $f_o$ is always equal to the desired carrier frequency $f_c$ and its gain constant $K_o$ always equal to $\pi/(2T)$ rad. per volt per sec.. However, additional measures are required in practice to keep these parameters $f_o$ and $K_o$ of oscillator 6 at their prescribed values. To this end oscillator 6 in FIG. 14 is included in a control loop 34, a multiplier 35 and a subsequent adder 36 being provided in the connection between premodulation circuit 21 and oscillator 6, the output of oscillator 6 being connected to a detection circuit 37 for producing the correction signals applied to multiplier 35 and adder 36. Since a deviation of $f_o$ relative to the desired value $f_c$ is equivalent to a shift of the control voltage for oscillator 6, the deviations of $f_o$ can be compensated by an additive correction of this control voltage by means of adder 36. Likewise, a deviation of $K_o$ relative to the desired value $\pi/(2T)$ is equivalent to a change in the magnitude of the control voltage for oscillator 6, so that the deviations of $K_o$ can be compensated by a multiplicative correction of this control voltage by means of multiplier 35. In order to enable detection circuit 37 to produce the required correction signals, at least information regarding the desired carrier frequency $f_c$ and information regarding the instants of occurrence of the data symbols must be available therein. To this end detection circuit 37 in FIG. 14 is connected to a crystal oscillator 38 whose frequency has a given relation to carrier frequency $f_c$, and to clock signal source 4 in FIG. 1, whose frequency is equal to the symbol rate $1/T$. Furthermore, use can be made in detection circuit 37 of the relation between the total phase change $\Delta\phi(m)$ and the data symbols $b(m)$, $b(m-1)$, $b(m-2)$ given by formula (10) in order to increase the control speed of control loop 34, for which purpose the data symbols can be applied to detection circuit 37 as shown in FIG. 14 by means of a dotted line.

There are various way in which this detection circuit 37 may be constructed. By way of example, FIG. 15 shows an implementation of frequency modulation stage 5, as illustrated in FIG. 14, in which detection circuit 37 is arranged so that only a small number of elements need be used.

Figure 15:
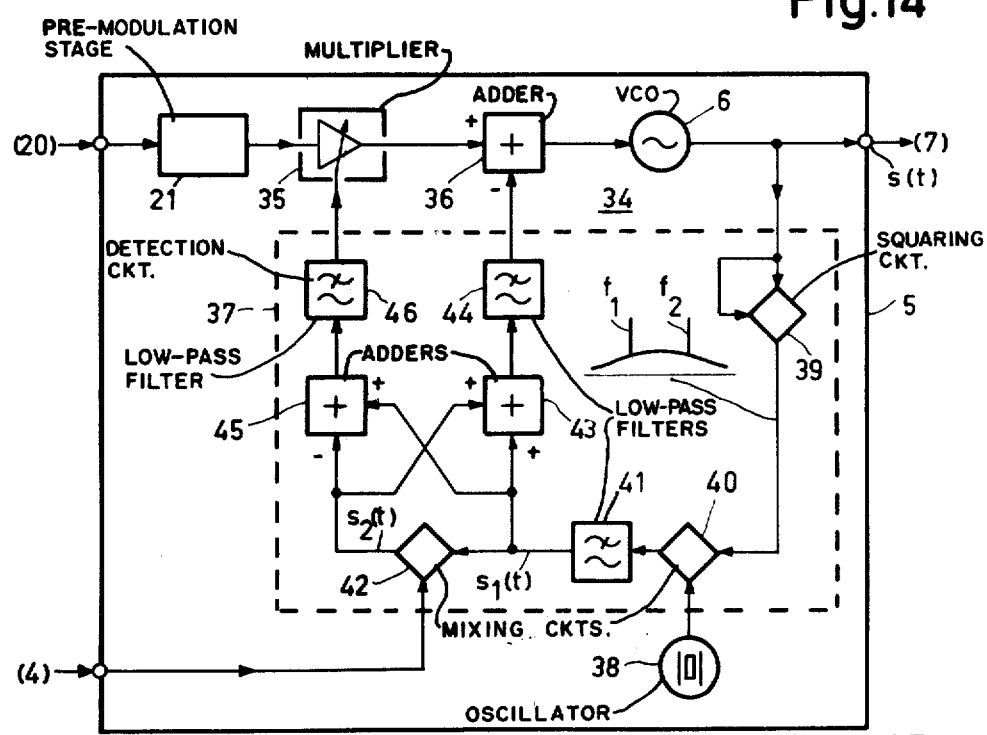
FIG. 15 is a block diagram of a further elaboration of the frequency modulation stage in FIG. 14.

In FIG. 15 detection circuit 37 comprises a squaring circuit 39 in which the output signal of oscillator 6 is multiplied by itself. Now it can be proved that the spectrum of this squared signal contains two discrete components at frequencies $f_1$ and $f_2$ which satisfy, for the correct values of parameters $f_o$ and $K_o$, the relations $$f_1 = 2f_c - 1/(2T) \qquad (26)$$
$$f_2 = 2f_c + 1/(2T)$$

so that the difference $(f_2 - f_1)$ is just equal to the symbol rate $1/T$. With deviating values of parameters $f_o$ and $K_o$ the discrete components at frequencies $f_1$ and $f_2$ are subjected to changes which can be used for generating the two control signals. To this end the squared signal is multiplied in a mixing circuit 40 by the output signal of crystal oscillator 38 whose frequency here is equal to $(2f_c + 1/(2T))$, so that a low frequency signal is produced having a spectrum containing two discrete components which, for the correct values of parameters $f_o$ and $K_o$, are at the frequencies $f = 1/T$ and $f = 0$. This low frequency signal is selected by means of a lowpass filter 41 having a cutoff frequency above the symbol rate $1/T$, and multiplied in a mixing circuit 42 by the output signal of source 4 in FIG. 1, whose frequency is equal to the symbol rate $1/T$. The correction signal for correcting deviating values of $f_o$ are then obtained by adding the output signals of filter 41 and mixing circuit 42 by means of an adder 43 and by averaging the sum signal over a long period of time by means of a smoothing filter 44. This correction signal is subtracted from the control voltage for oscillator 6 by means of adder 36. On the other hand the control signal for correcting deviating values of $K_o$ is obtained by subtracting the output signal of mixing circuit 42 from the output signal of filter 41 by means of an adder 45 and by averaging the difference signal over a long period of time by means of a smoothing filter 46. This correction signal is used to change the multiplication factor of multiplier 35. This multiplier 35 can be constructed as a controllable amplifier having a nominal gain factor equal to unity, the output signal of the smoothing filter 46 controlling this gain factor.

It appears from FIG. 15 that control loop 34 may be considered as two co-operating phase-locked loops. It is difficult to describe the operation of this two-dimensional control loop 34 but a rough idea of the operation can be obtained by assuming that for the correct values of $f_o$ and $K_o$ of oscillator 6 its output signal $s(t)$ can again be written as $$s(t) = \sin[\omega_c t + \phi(t)] \qquad (27)$$

that the output signals of crystal oscillator 38 and clock signal source 4 (in FIG. 1) can be written as $$\sin(2\omega_c t + \pi t/T) \qquad (28)$$
$$\cos(2\pi t/T)$$

that, at the output of filter 41 and mixing circuit 42 respectively, the signals $s_1(t)$ and $s_2(t)$ occur and that in adders 43, 45 the conversion factor of mixing circuit 42 is taken into account. It is further assumed that the binary values "0" and "1" in the data signal occur with equal probabilities, which assumption furnishes no problems in practice in those cases in which a form of data-scrambling is used in data signal source 3 of transmitter 1 in FIG. 1.

For the case where parameter $f_o$ shows a positive deviation so that it applies that $$f_o = (1 + \delta_1) f_c, \quad \delta_1 << 1 \qquad (29)$$

and parameter $K_o$ has the correct value, signal $s(t)$ has the form $$s(t) = \sin[(1 + \delta_1)\omega_c t + \phi(t)] \qquad (30)$$

It can then be proven that, for those time intervals in which the phase $\phi(t)$ increases by $\pi/2$ rad. per symbol period T, only signal $s_1(t)$ has a d.c. component of positive polarity proportional to $\delta_1\omega_c$. It can also be proven that, for those time intervals in which the phase $\phi(t)$ decreases by $\pi/2$ rad. per symbol period T, only signal $s_2(t)$ has a d.c. component of likewise a positive polarity proportional to $\delta_1\omega_c$. Both of said time intervals occur with the same probability, so that the described manner of combining the signals $s_1(t)$ and $s_2(t)$ in adders 43, 44 results in this case in a control voltage having the value zero at the output of smoothing filter 46 and a control voltage of positive polarity, proportional to $\delta_1\omega_c$, at the output of smoothing filter 44. This last control voltage is subtracted in adder 36 from the control voltage for oscillator 6 so that the positive deviation of parameter $f_o$ is substantially reduced to a value zero.

For the case where parameter $K_o$ has a positive deviation so that it holds that $$K_o = (1 + \delta_2)\pi/(2T), \quad \delta_2 << 1 \qquad (31)$$

and parameter $f_o$ is of the correct value, signal $s(t)$ has the form $$s(t) = \sin[\omega_c t + (1 + \delta_2)\phi(t)] \qquad (32)$$

It can be proven that, for those time intervals in which the phase $\phi(t)$ increases by $\pi/2$ rad. per symbol period T, only signal $s_1(t)$ has a d.c. component of positive polarity proportional to $\delta_2\pi/(2T)$. It can also be proven that, for those time intervals in which the phase $\phi(t)$ decreases by $\pi/2$ rad. per symbol period, only signal $s_2(t)$ has a d.c. voltage component proportional to $\delta_2\pi/(2T)$, but now with negative polarity. Said time intervals occur with the same probability so that the manner of combining the signals $s_1(t)$ and $s_2(t)$ in adders 43, 45 results, in this case, in a correction voltage having the value zero at the output of smoothing filter 44 and a correction voltage of positive polarity, proportional to $\delta_2\pi/(2T)$, at the output of smoothing filter 46. This last-mentioned correction voltage is used to give the multiplication factor of multiplier 35 a value smaller than unity so that the magnitude of the control voltage for oscillator 6 is reduced and the positive deviation of parameter $K_o$ is substantially reduced to a value zero.

The case where both parameters $f_o$ and $K_o$ show deviations can then be considered in the first instance as the superimposition of the two cases described above in which only parameter $f_o$ or only parameter $K_o$ shows a deviation.

In this manner the parameters $f_o$ and $K_o$ of oscillator 6 are kept at their prescribed values of $f_c$ and $\pi/(2T)$, respectively, by means of the two-dimensional control loop 34, so that output signal $s(t)$ of oscillator 6 also, has in practice, a phase $\phi(t)$ which does not substantially deviate from the desired phase $\phi(t)$ for the ideal case considered in the preceding section E(1).

The most important advantage of this type of implementation of modulation stage 5, shown in FIG. 14 and FIG. 15, is that the amplitude of the modulated output signal is very constant, also in practice. However, the use of a two-dimensional control loop 34 is accompanied by aquisition and stability problems, which requires, for the proper operation of this control loop 34, the use of a data scrambler in data signal source 3 and couples the loop bandwidth to the symbol rate $1/T$ of the data signal.

The above problems are avoided in a second type of construction of modulation stage 5 which is based on an orthogonal modulation method and whose general block diagram is shown in FIG. 16. The differentially encoded data signal of encoding circuit 20 in FIG. 1 is applied in FIG. 16 to a signal processing circuit 47 for generating a signal $\cos[\phi(t)]$ at its first output 48 and a signal $\sin[\phi(t)]$ at its second output 49, $\phi(t)$ being the desired phase of the modulated output signal $s(t)$ of modulation stage 5. Although an implementation in analog techniques is theoretically possible, an implementation of signal processing circuit 47 in digital techniques offers so many practical advantages that it should be preferred and further description will be limited thereto. The signal at output 48 is applied to a product modulator 50 through a lowpass filter 51 for suppressing signal components at the output sample frequency $f_s$ of signal processing circuit 47 and at multiples thereof and the signal at output 49 is also applied to a product modulator 52 through a low-pass filter 53, which is identical to filter 51. In both product modulators 50, 52, the signals $\cos[\phi(t)]$ and $\sin[\phi(t)]$ are multiplied by carriers, whose frequency is equal to the desired carrier frequency $f_c$ and whose phase difference amounts to $\pi/2$ rad., and more specifically by a carrier $\sin(\omega_c t)$ in product modulator 50 and by a carrier $\cos(\omega_c t)$ in product modulator 52. The output signals of the two product modulators 50, 52 are added by means of an adder 54, which results in a sum signal $s(t)$ which is given by $$s(t) = \cos[\phi(t)]\cdot\sin(\omega_c t) + \sin[\phi(t)]\cdot\cos(\omega_c t) \tag{33}$$

which can be written as $$s(t) = \sin[\omega_c t + \phi(t)] \tag{34}$$

so that at the output of modulation stage 5, the modulated signal with the desired phase $\phi(t)$ is indeed obtained.

Now it will be proven that this signal processing circuit 47 can derive the desired phase $\phi(t)$ and, consequently, the signals $\cos[\phi(t)]$ and $\sin[\phi(t)]$ from the incoming data signal $b(t)$. It follows, from the explantion of the operation of frequency modulation stage 5 of FIG. 4, that the phase pulse response $\theta(t)$ of modulation stage 5 is given by $$\theta(t) = (2\pi/T)\cdot\int_{-\infty}^{t} g'(\tau)\,d\tau + C' \tag{35}$$

$C'$ being a constant and $g'(t)$ being the impulse response associated with the transfer function $G'(\omega)$ given by formula (12). For the case in which the duration of this impulse response $g'(t)$ is limited, as above, to its central interval of a length 5T (cf. FIG. 7) and the constant $C'$ has the value zero, this phase-impulse response $\theta(t)$ is shown in time diagram a of FIG. 17. The desired phase $\theta(t)$ can then be obtained by convulating the data signal $b(t)$, which can be written as $$b(t) = \sum_{m=-\infty}^{\infty} b(m)\,\delta(t - mT) \qquad b(m) = \pm 1 \tag{36}$$

where $\delta(t)$ presents a Dirac-function, with the phase-impulse response $\theta(t)$ given by formula (35), which has the result $$\phi(t) = \sum_{m=-\infty}^{\infty} b(m)\,\theta(t - mT) + C \tag{37}$$

where $C$ is a constant which is fixed by giving the phase $\phi(t)$ at a reference instant. For the case in which the duration of the impulse response $g'(t)$ is limited in the above manner to 5T, the following relation can be deduced from formula (37) for the phase $\phi(t)$ in the time interval $mT < t \leq (m+1)T$ $$\phi(t) = \phi(mT) + \sum_{k=-2}^{2} b(m-k)\,\theta_1[t - (m-k)T] \tag{38}$$

where $\theta_1(t)$ is a function which, for instants $t$ in the interval $xT < t \leq (x+1)T$, $x$ being an integer, is given by $$\theta_1(t) = \theta(t - T/2) - \theta(xT - T/2) \tag{39}$$

In time diagram b of FIG. 17, the function $\theta_1(t)$ is given which is associated with to the phase-impulse response $\theta(t)$ of time diagram a in FIG. 17. If the phase $\phi(mT)$ is known, then the phase $\phi(t)$ in the subsequent symbol period T, in accordance with formulas (38) and (39), is fully determined by the data symbols $b(m-2)$, $b(m-1)$, $b(m)$, $b(m+1)$, $b(m+2)$ and the function $\theta_1(t)$. For deriving the signals $\cos[\phi(t)]$ and $\sin[\phi(t)]$ in this symbol period, it is then sufficient that the value modulo $2\pi$ of phase $\phi(t)$, in accordance with formula (38), is available.

Figure 18:
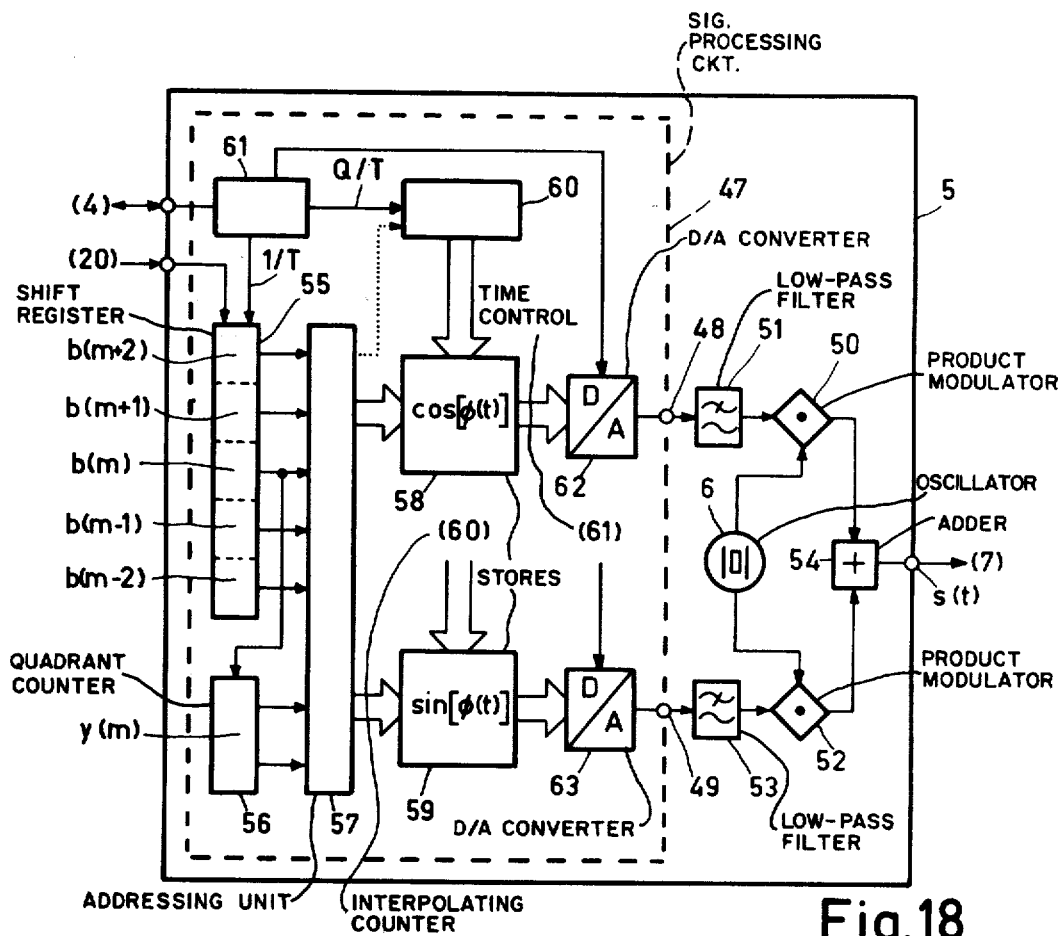
FIG. 18 is a block diagram of a further elaboration of the orthogonal modulation stage in FIG. 16.

Digital signal processing circuit 47 can be implemented in various manners. By way of example, FIG. 18 shows an embodiment of modulation stage 5, in accordance with FIG. 16, having a digital signal processing circuit 47 of a simple construction. This simple construction is achieved by using the fact that the phase $\phi(t)$ between the instants $t=mT$ and $t=(m+1)T$ can change by not more than an amount of $\pm\pi/2$ rad, and the fact that, within this time interval, the value modulo $2\lambda$ of phase $\phi(t)$ always remains in the same phase quadrant $[y\pi/2, (y+1)\pi/2]$ where $y=0, 1, 2$ or $3$, at a suitable choice of $\phi(t)$ at the reference instant—cf. time diagram d of FIG. 8—and any transition to another phase quadrant takes place at the instant $t=(m+1)T$. As is also apparent from time diagram d of FIG. 8, the data symbols b(m), b(m+1) together determine the phase $\phi(t)$ after instant $t=(m+1)T$ remains in the same phase quadrant as in the time interval $mT < t \leq (m+1)T$, or whether it passes to an adjacent higher or lower phase quadrant. In particular, there exists, between the number y(m) of the phase quadrant for the time interval $mT < t \leq (m+1)T$, the number y(m−1) for the previous symbol period and the data symbols b(m−1), b(m), the relation as given in the following table

| b(m − 1) | b(m) | y(m) |
|---|---|---|
| +1 | +1 | y(m − 1) + 1 |
| +1 | −1 | y(m − 1) |
| −1 | +1 | y(m − 1) |
| −1 | −1 | y(m − 1) − 1 |

To determine the signals cos $[\phi(t)]$ and sin $[\phi(t)]$ in the time interval $mT < t \leq (m+1)T$, it is therefore sufficient, on the basis of formula (38), that the data symbols b(m−2), b(m−1), b(m), b(m+1), b(m+2) and the function $\theta_i(t)$, in accordance with formula (39), are known which, together, determine the value of phase $\phi(t)$ in a given phase quadrant, and that also the quadrant number y(m) modulo 4 of the phase $\phi(mT)$ is known which determines in which phase quadrant this phase $\phi(t)$ lies.

In signal processing circuit 47 of FIG. 18 the differentially encoded data signal b(t) of coding circuit 20 in FIG. 1 is applied to a shift register 55, whose contents are shifted at a frequency equal to the symbol rate 1/T. This shift register 55 has a number of p elements equal to the number of symbol periods pT of the central interval to which the impulse response g'(t) is limited, so that in this case $p=5$. At the instant $t_*=mT$ the contents of the shift register 55 are as shown in FIG. 18 and, on the basis of the preceding, these contents are representative of the value of phase $\phi(t)$ in the time interval $mT < t \leq (m+1)T$, independent of the phase quadrant. In addition, the output of the central element of shift register 55 is connected to a quadrant counter 56 whose counting position is the quadrant number y(m) modulo 4. This quadrant counter 56 is implemented as a modified modulo-4 up/down counter, whose counting position y(m) is related to the previous counting position y(m−1) and the data symbols b(m−1), b(m), in accordance with the above table. The contents of shift register 55 (5 bits), and the counting position of quadrant counter 56 (2 bits), which together represent the value of phase $\phi(t)$ and the phase quadrant for the time interval $mT < t \leq (m+1)T$, function as a 7-bit address, which is applied, by an addressing unit 57, to two digital stores 58 and 59, in which, for each phase quadrant, the signal samples are stored of signal cos $[\phi(t)]$ and signal sin $[\phi(t)]$, respectively, for the possible values of phase $\phi(t)$ in one symbol period T. For a duration pT of impulse response g'(t) and thus for a number of p elements of shift register 55, p2 values of phase $\phi(t)$ are possible in one symbol period T. In this case $p=5$ and, consequently, $p2=25$. Both stores 58, 59 are read at a sampling rate $f_s$ by means of an interpolating counter 60 which delivers a read pulse in every counting position. For this sampling rate $f_s$, it holds that $$f_s = 1/T_s = Q/T \qquad (40)$$

the interpolation factor Q being an integer, so that interpolating counter 60 is implemented as a modulo-Q-counter. Further details regarding this known interpolation method can be found in references D(9) and D(10). The control signal of frequency $f_s$ for interpolating counter 60, and also the shift signal of frequency 1/T for shift register 55, originate from a time control unit 61 which is synchronized with clock signal source 4 in FIG. 1. The read signal samples cos $[\phi(mT+qT_s+T_s/2)]$ and sin $[\phi(mT+qT_s+T_s/2)]$, where $q=0, 1, 2, \ldots, (Q-1)$, are applied through a digital-to-analog converter 62 to output 48 and through a digital-to-analog converter 63 to output 49, respectively. The signals at both outputs 48, 49 of signal processing circuit 47 are then processed, in FIG. 18, in the same manner as in modulation stage 5 of FIG. 16. Lowpass filters 51, 53, for suppressing signal components at the sample frequency $f_s$ and multiples thereof, must satisfy the requirement of being identical; in particular, the time delays in their passband must be independent of the frequency and must be identical. To prevent the practical implementation of lowpass filters 51, 53 from becoming too elaborate, the interpolation factor Q should be chosen sufficiently high, for example, $Q=8$ or $Q=16$. A cutoff frequency of lowpass filters 51, 53 equal to half the sample frequency $f_s/2 = Q/(2T)$ is then acceptable for this choice of interpolation factor Q, considering the spectrum of the desired signals cos $[\phi(t)]$ and sin $[\phi(t)]$.

At an increase of the interpolation factor Q, and especially in the case of a prolongation of the duration pT of impulse response g'(t), the physical sizes of the stores 58, 59 increase rapidly; so a value 2Q instead of Q results in an increase of the sizes by a factor of 2 and a value of (p+2)T instead of pT results in an increase in size by a factor of 4. It is, however, possible to effect a reduction in the size of the stores 58, 59 by a factor of 4 by using certain properties of the cosine and sine functions. As can also be seen from time diagram d of FIG. 8, the phase $\phi(t)$ in a quadrant $(0, \pi/2)$ can increase in accordance with a given curve z from 0 rad. to $\pi/2$ rad. in one symbol period, but can also decrease in accordance with a curve $z_s$ which is mirror-symmetrical with curve z, from $\pi/2$ rad. to 0 rad., and, can likewise increase in quadrant $(\pi/2, \pi)$ in accordance with curve z from $\pi/2$ rad. to $\pi$/rad. or decrease in accordance with curve $z_s$ from $\pi$ rad. to $\pi/2$ rad.. In all four cases, signal sin $[\phi(t)]$ passes through the same sequence of signal values, albeit in the reverse direction in the second and third cases. If now only the signal values sin $[\phi(t)]$ for the first case, in which phase $\phi(t)$ increases in accordance with curve z from 0 rad, to $\pi/2$ rad. are stored in a certain portion of store 59, then this portion can be used in the same manner not only for the fourth case but also for the second and the third case, provided this portion is then read in the reverse direction. It is also possible to obtain the same savings in storage room by a factor of 4 for both stores 58, 59, in their totality, by only storing the signal values of cos $[\phi(t)]$ in store 58 and those of sin $[\phi(t)]$ in store 59 for increasing phase φ(t) in quadrant (0, π/2) and for increasing phases φ(t) in quadrant (π,3π/2). In that case the read direction (normal or reverse) is always equal for store 58, for each symbol period, to that, for store 59, so that also in that case, the address for both stores 58, 59 can be identical. The remaining alterations of signal processing circuit 47 are limited to addressing unit 57 and interpolating counter 60. In addressing unit 57, the four original addresses, which are associated with a given sequence of signal values cos [φ(t)] and the corresponding sequence of signal value sin [φ(t)], are in that case converted into a signal address for both stores 58, 59, the address being formed by one of the four original addresses and one information bit for the read direction of both stores 58, 59. In that case, interpolating counter 60 is implemented as a modulo-Q up/down counter to which the information bit for the read direction is applied for controlling the counting direction (up or down), as shown by means of a dotted line in FIG. 18.

The important advantage of this second type of implementation of modulation stage 5, shown in FIG. 16 and FIG. 18, is that, by utilizing the digital signal processing circuit 47, the problems, which are related to the use of the two-dimensional control loop 34 in the first type of implementation in accordance with FIG. 14 and FIG. 15, are avoided. For a proper operation of this second type of implementation, the two low-pass filters 51, 53 should have identical amplitude and phase characteristics, and the same applies also to the two (linear) product modulators 50, 52. If these requirements are not satisified by either the filters 51, 53, or the modulators 50, 52, or both, filters 51, 53 and modulators 50, 52, then unwanted amplitude variations and unwanted phase variations will occur in the output signal s(t) of modulation stage 5, so that this output signal then has the form $$s(t) = A(t) \sin [\omega_c t + \phi(t) + \Psi(t)] \quad (41)$$

where A(t) represents the amplitude variation and Ψ(t) the unwanted phase variation, instead of the desired form $$s(t) = \sin [\omega_c t + \phi(t)] \quad (42)$$

Figure 19:
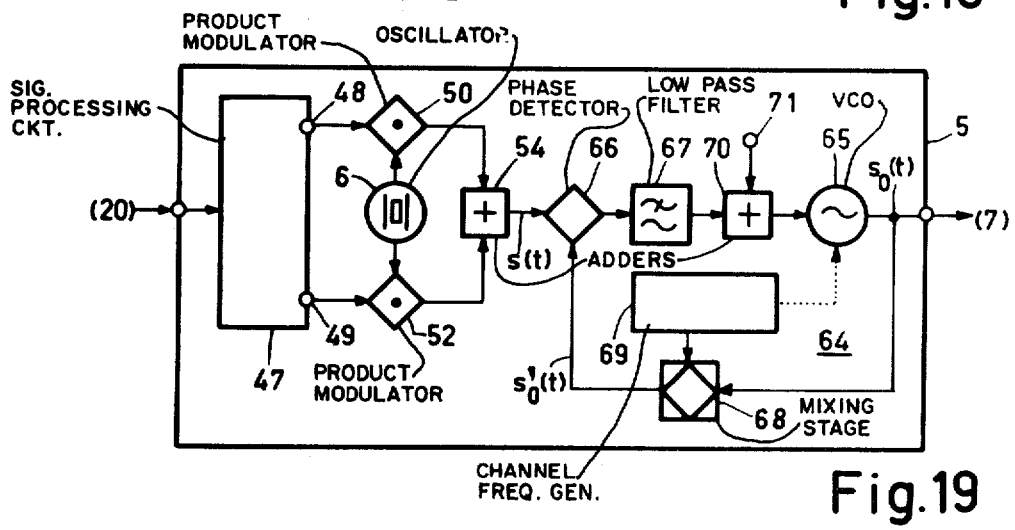
FIG. 19 is a block diagram of a variant of the orthogonal modulation stage in FIG. 16 and FIG. 18.

FIG. 19 shows a variant of modulation stage 5, shown in FIG. 16 and FIG. 18, in which the lowpass filters 51, 53 are not used and in which the unwanted amplitude variations A(t) are avoided. Elements in FIG. 19 which correspond to elements in FIG. 16 and FIG. 18 are indicated in FIG. 19 by means of the same reference numerals as in FIG. 16 and FIG. 18.

In FIG. 19 the signals at outputs 48, 49 of signal processing circuit 47, which originate from the digital-to-analog converters (62, 63 in FIG. 18) are directly applied to product modulators 50, 52 so that, in the sum signal s(t) at the output of adder 54, besides the wanted modulated signal with carrier frequency $f_c$ given by formula (42), unwanted sidebands also appear at frequencies which are spaced a distance equal to the output sampling frequency $f_s$ of the signal processing circuit 47 (and multiples thereof) from the desired carrier frequency $f_c$. In this case sum signal s(t) can again be written in accordance with formula (41), the amplitude variation A(t) now being mainly the result of inequalities in the two product modulators 50, 52 and deviating in practice less than 2% from the desired constant value. This sum signal s(t) is now applied to a phase-locked loop 64 which comprises a voltage-controlled oscillator 65, whose rest frequency is substantially equal to the desired carrier frequency $f_c$ and whose output signal $s_o(t)$ forms the output signal of modulation stage 5. This signal $s_o(t)$ is applied to a first input of a phase detector 66 of the zero-crossing type, a second input of which receives the sum signal s(t), from adder 54, as a switching signal. In the output signal of phase detector 66, signal components also occur at sampling frequency $f_s$ (and multiples thereof), which components are caused by the unwanted sidebands of sum signal s(t). From this output signal of phase detector 66 the control voltage for oscillator 65 is now obtained by means of a lowpass filter 67, which suppresses the signal components at sampling frequency $f_s$ (and multiples thereof) and which has, at least up to half the symbol rate 1/(2T) of the data signal, a linear phase characteristic. As previously stated, the sampling frequency $f_s$ has the value 8/T for an interpolation factor Q=8 in signal processing circuit 47. If now, as was the case for lowpass filter 51, 53 in FIG. 18, the cutoff frequency of lowpass filter 67 in FIG. 19 is made equal to half the sampling frequency $f_s/2 = 4T$, then this filter 67 has a broad-band characteristic for the desired signal, so that phase-locked loop 64 can very rapidly follow the phase of the presented sum signal s(t) of adder 54.

In this manner, an output signal $s_o(t)$ of modulation stage 5 is then obtained which can be written as $$s_o(t) = \cos [\omega_c t + \phi(t) + \Psi_1(t)] \quad (43)$$

and which, consequently, exhibits a constant amplitude but not the said unwanted sidebands. The unwanted small phase variations $\Psi_1(t)$ in signal $s_o(t)$ are approximately equal to the phase variations Ψ(t) in sum signal s(t) at the output of adder 54, which are mainly the result of inequalities in the two product modulators 50, 52 and which are in practice smaller than 0.03 rad.

So far, it has been assumed that voltage-controlled oscillator 65 in FIG. 19 has a rest frequency which is substantially equal to the carrier frequency $f_c$ of (crystal) oscillator 6, and that output signal $s_o(t)$ of oscillator 65 is directly applied to phase detector 66. For values of the desired carrier frequency $f_c$ in the order of magnitude of 100 MHz, the realisation of a modulation stage thus constructed still offers no difficulties because the product modulators 50, 52, available in this frequency range, may be considered as linear modulators for low signal powers. Practical difficulties are encountered, in the realisation of the thus constructed modulation stage 5, for values of the desired carrier frequency $f_c$ in the order of magnitude of 1 GHz because, in this frequency range, properly usable voltage-controlled oscillators 65 are still available but product modulators 50, 52 can hardly be considered as linear modulators for very low signal powers. However, these difficulties can be avoided in a simple manner by implementing phase-locked loop 64 in FIG. 19 as a translation loop.

If output signal $s_o(t)$ of oscillator 65 must be transmitted in a channel having a central frequency $f_c$ of, for example, 1 GHz, the rest frequency of oscillator 65 is then adjusted to a frequency which is substantially equal to central frequency $f_c$, and (crystal) oscillator 6 is adjusted to a frequency $f_c'$ at which linear product modulators 50, 52 are still easy to be realized, for example $f_c' = 100$ MHz. Signal $s_o(t)$ is then applied to a mixing stage 68 and mixed therein with a signal of constant amplitude having a frequency $f_c - f_c'$, so that, in this example, $f_c - f_c' = 900$ MHz, whereafter the mixing product $s_o'(t)$ at the difference frequency is selected in mixing stage 68 by means of a lowpass filter. This signal $s_o'(t)$ only differs from signal $s_o(t)$ in that the carrier frequency of signal $s_o'(t)$ is substantially equal to frequency $f_c'$ of oscillator 6. Said linearity problems do not occur in mixing stage 68 because its two input signals have a constant amplitude. Signal $s_o'(t)$ is then applied to the first input of phase detector 66 to obtain the control voltage for oscillator 65. The signal of constant amplitude, having a frequency $f_c - f_c'$ for mixing 68, originates from a source 69 which can be implemented, in transmission systems of the multi-channel type, as a channel frequency generator and from which the setting signal for the rest frequency of voltage-controlled oscillator 65 can also be derived, as indicated in FIG. 19 by means of a dotted line.

Modulation stage 5 shown in FIG. 19 offers the additional advantage that a small alteration is sufficient to also enable the generation of output signal $s_o(t)$ which is frequency-modulated by an analog signal $a(t)$ with a passband character, such as a voice signal for telephony purposes. To this end, an adder 70 is included in the connection from lowpass filter 67 to voltage-controlled oscillator 65, with an input 71 to which a voltage zero is applied during data transmission, while a voltage proportional to signal $a(t)$ during the transmission of analog signals. The further alteration in modulation stage 5 then consists in that, during the transmission of analog signals, the corner frequency of lowpass filter 67 is decreased to a frequency near the lower limit of the frequency band of signal $a(t)$, which in practice is analogous to switching-over one or more resistors in this filter 67, and that, in addition, an unmodulated carrier signal of frequency $f_c'$ is provided at the second input of phase detector 66, which can be achieved by presenting, to the input of signal processing circuit 47, a data signal of the form $..+1,-1,+1,-1+1,-1,...$ or , which is simpler in practice, by not connecting this second input of phase detector 66 to the output of adder 54, but to one of the two outputs of oscillator 6.

What is claimed is:

1. A system for transmitting binary data signals with a given symbol rate $1/T$ from a transmitter to a receiver over a transmission channel of limited bandwidth, this transmitter comprising a data signal source, a clock signal source coupled to said data signal source for synchronizing the data signal source, a modulation stage comprising a carrier oscillator connected to the data signal source for generating an angle-modulated carrier signal of a substantially constant amplitude and a continuous phase, and an output circuit for supplying the angle-modulated carrier signal to the transmission channel, the receiver comprising an input circuit for obtaining the transmitted angle-modulated carrier signal from the transmission channel, a reference carrier circuit coupled to the input circuit for recovering two reference carriers with a phase difference of $\pi/2$ rad., a demodulation circuit, connected to the input circuit and the reference carrier circuit, for coherently demodulating the transmitted angle-modulated carrier signal by these reference carriers and for generating first and second demodulated signals, a reference clock signal circuit coupled to the input circuit for recovering two reference clock signals of half the symbol rate $1/(2T)$ with a phase difference of $\pi$ rad., and a regeneration circuit comprising two sampling circuits connected to the demodulation circuit and the reference clock signal circuit for sampling the first and second demodulated signals with these reference clock signals, said receiver further comprising a logic combination circuit for obtaining regenerated binary data signals from the sampled first and second demodulated signals, wherein the modulation stage in the transmitter generates an angle-modulated carrier signal of substantially constant amplitude, whose continuous phase $\phi(t)$ in each symbol interval of length T changes by an amount expressed in rad., from the sequence $-\pi/2, -\pi/4, O, \pi/4, \pi/2$, this amount being determined for the relevant symbol interval by at least two successive data symbols, the value of the phase $\phi(t)$ for instants t within the relevant symbol interval being determined by a filtered version of at least these two successive data symbols.

2. A system as claimed in 1, wherein the modulation stage in the transmitter generates a frequency-modulated carrier signal, the amount of the phase change for the relevant symbol interval being determined in correspondence with a partialresponse polynomial with integral coefficients, the phase value for instants within the relevant symbol interval being determined by the integral of the convolution of the data symbols with a filter response satisfying the third Nyquist criterion taking account of said polynomial.

3. A system as claimed in claim 2, wherein the modulation stage in the transmitter generates a frequency-modulated carrier signal, said partial-response polynomial being of class 2 with 3 superpositions, said filter response having a spectral bandwidth between one and one and a half times the minimum Nyquist bandwidth for the given symbol rate $1/T$.

4. A system as claimed in claim 1, wherein the modulation stage in the transmitter generates a phase-modulated carrier signal, the amount of the phase change for the relevant symbol interval being determined in correspondence with a partialresponse polynomial with integral coefficients, the phase value for instants within the relevant symbol interval being determined by the convolution of the data symbols with a filter response satisfying the first Nyquist criterion taking account of said polynomial.

5. A system as claimed in any of the claims 1–4, wherein the modulation stage comprises a signal-controlled carrier oscillator and a pre-modulation circuit coupled to the signal-controlled carrier oscillator and connected to the data signal source for generating a control signal for this oscillator.

6. A system as claimed in claim 5, wherein the modulation stage further comprises a multiplier and an adder stage serially coupled between said pre-modulation stage and said signal-controlled carrier oscillator, a frequency reference source having a prescribed frequency relative to a given carrier frequency, and a detection circuit, having a first input coupled to said clock signal source, a second input coupled to said frequency reference source, and a third input coupled to the output of said signal-controlled carrier oscillator, said detection circuit generating a first correction signal, representative of deviations of the signal-controlled carrier oscillator gain constant relative to a value fixed by the symbol rate $1/T$, applied to said multiplier for multiplicative correction of said control signal, and a second correction signal, representative of deviations of the signal-controlled carrier oscillator rest frequency relative to the given carrier frequency, applied to said adder for additive correction of said control signal.

7. A system as claimed in any of the claims 1–4, wherein the modulation stage comprises a signal processing circuit connected to the data signal source for generating a first and a second signal which is representative of cos $[\phi(t)]$ and sin $[\phi(t)]$ respectively, $\phi(t)$ being the phase of said angle-modulated carrier signal, the modulation stage further comprising an orthogonal modulation circuit connected to the carrier oscillator for modulating said first and second signals on first and second carriers of equal frequency with a phase difference of $\pi/2$ rad.

8. A system as claimed in claim 7, wherein the modulation stage further comprises a phase-locked loop having a signal-controlled oscillator for generating said angle-modulated carrier signal and a phase detector of the zero-crossing type, having a switching input connected to the output of the orthogonal modulation circuit, a signal input coupled to the output of the signal-controlled oscillator and an output coupled to a loop filter for generating a control signal for the signal-controlled oscillator.

9. A system as claimed in claim 8, wherein the phase-locked loop is arranged as a frequency translation loop having a translation frequency source and a mixing stage, the output of the signal-controlled oscillator being coupled to the signal input of the phase detector through the mixing stage connected to the translation frequency source.

* * * * *